(12) United States Patent
Mabuchi et al.

(10) Patent No.: US 7,364,194 B2
(45) Date of Patent: Apr. 29, 2008

(54) INFLATOR

(75) Inventors: Satoshi Mabuchi, Aichi-ken (JP); Eiji Sato, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 245 days.

(21) Appl. No.: 10/990,770

(22) Filed: Nov. 18, 2004

(65) Prior Publication Data

US 2005/0116446 A1    Jun. 2, 2005

(30) Foreign Application Priority Data

Nov. 21, 2003  (JP) ............................. 2003-392316
Jul. 27, 2004   (JP) ............................. 2004-218667

(51) Int. Cl.
*B60R 21/26* (2006.01)
(52) U.S. Cl. ..................................... 280/741
(58) Field of Classification Search ............... 280/736, 280/740, 741, 742, 728.2
See application file for complete search history.

(56) References Cited

U.S. PATENT DOCUMENTS

| | | | |
|---|---|---|---|
| 4,915,410 A * | 4/1990 | Bachelder ................... 280/732 |
| 4,964,654 A * | 10/1990 | Bishop et al. ............. 280/728.2 |
| 5,340,147 A * | 8/1994 | Fontecchio et al. ...... 280/728.2 |
| 5,433,471 A * | 7/1995 | Shepherd et al. ........ 280/728.2 |
| 5,462,305 A * | 10/1995 | Hamada .................. 280/728.2 |
| 5,498,029 A * | 3/1996 | Mossi et al. ................. 280/741 |
| 5,533,745 A * | 7/1996 | Jenkins et al. ........... 280/728.2 |
| 5,611,563 A | 3/1997 | Olson et al. |
| 5,687,988 A | 11/1997 | Storey et al. |
| 5,732,971 A * | 3/1998 | Lutz ......................... 280/728.2 |
| 5,918,898 A * | 7/1999 | Wallner et al. .......... 280/728.2 |
| 6,082,761 A * | 7/2000 | Kato et al. ................ 280/730.2 |
| 6,299,200 B1 * | 10/2001 | Bowers et al. ........... 280/730.2 |
| 6,364,341 B1 * | 4/2002 | Perkins et al. ........... 280/728.2 |
| D471,080 S * | 3/2003 | Baumbach ................... D8/354 |
| 6,837,513 B2 * | 1/2005 | Oka et al. ................. 280/728.2 |
| 6,860,506 B2 * | 3/2005 | Ogata et al. .............. 280/730.2 |
| 7,090,243 B2 * | 8/2006 | Igawa ...................... 280/728.2 |

FOREIGN PATENT DOCUMENTS

| | | |
|---|---|---|
| EP | 1 331 141 A | 7/2003 |
| JP | A-2001-171468 | 6/2001 |
| JP | 2001-347915 | 12/2001 |

* cited by examiner

*Primary Examiner*—Tony Winner
*Assistant Examiner*—Leonard McCreary, Jr.
(74) *Attorney, Agent, or Firm*—Posz Law Group, PLC

(57) ABSTRACT

An inflator is located inside an airbag of airbag device for supplying inflation gas. The inflator includes a substantially cylindrical body for generating inflation gas, and a substantially tubular retainer made of sheet metal to be mounted around the body for holding the body by fastening a fastening portion. The retainer includes mounting bolts for mounting the airbag to a predetermined mounting position. The retainer includes a fastening portion, a first support portion and a second support portion which are arranged in order along axial direction of the body to abut against a circumference of the body. The fastening portion and the second support portion are located in a substantially opposite area from the first support portion in the circumference of the body based on a center of a cross section of the body taken perpendicularly to the axial direction of the body as the retainer holds the body.

11 Claims, 19 Drawing Sheets

INFLATOR

The present application claims priority from Japanese Patent Application No. 2003-392316 of Mabuchi, filed on Nov. 21, 2003, and Japanese Patent Application No. 2004-218667 of Mabuchi et al., filed on Jul. 27, 2004, the disclosures of which are hereby incorporated into the present application by reference.

BACKGROUND OF THE INVENTION

1. Field of the Invention

The present invention relates to an inflator for supplying inflation gas to an airbag of airbag device for automobile which is used in an inserted state in the airbag.

2. Description of Related Art

Japanese Patent Laid-Open No. 2001-171468 discloses an inflator for a side impact airbag device mountable on a vehicle seat. The inflator is inserted within an airbag for supplying the airbag with inflation gas. The inflator includes a substantially cylindrical body for generating inflation gas, and a substantially tubular retainer made of sheet metal and mounted around the body for holding the body. The retainer includes a mounting means for mounting the airbag to a predetermined mounting position.

U.S. Pat. No. 5,687,988 discloses an inflator which is provided in an end face of a cylindrical body thereof with a flat mounting stud. A retainer made of sheet metal for holding the body is formed into a half-pipe shape which is open upward for supplying inflation gas. One of two axial ends of the retainer is provided with an end wall, and this end wall includes a slot for receiving the mounting stud. Adjacent to an open end opposing to the end wall having the slot is an arm which is plastically deformed to clamp the inflator body like a belt. When the inflator body is held by the retainer, the mounting stud of the body is inserted into the slot of the retainer, and the arm is deformed to belt-fasten the body. Thus both ends of the body is held by the retainer by the mounting stud fitted in the slot and the arm abutting against a circumference of the body, so that the inflator body is prevented from lifting out toward the gas supplying opening. The arm contacting the circumference of the inflator body prevents the body from sliding out from the open end side of the retainer.

In the inflator in the former reference, the inflator body is held by the retainer by fastening two fastening portions both of which are located in the vicinity of an axial center of the retainer. The inflator is put in the airbag in that state, and the airbag is folded to assemble an airbag device. When the airbag is folded, accordingly, the work has to be done in an environment considering malfunction of the inflator inserted in the airbag, which complicates the folding work of the airbag.

It might be possible to insert the inflator in the airbag after the folding work of the airbag. However, the mounting means such as bolts for mounting the airbag to the mounting position are protruded from the retainer of the inflator, and the mounting means obstruct insertion of the inflator in the airbag after the folding work of the airbag.

It also might be possible to insert the retainer only in the airbag firstly, and then set the inflator body in the retainer after the folding work of the airbag. However, the fastening portions of the conventional retainer are located in axial center. In the foregoing processes, the fastening portions arranged inside the folded airbag have to be fastened from outside of the airbag, which may damage the airbag.

As to the inflator in the latter reference, it might be possible to insert the retainer only in the airbag such that the arm of the retainer is located out of the airbag, and then to fold the airbag and set the inflator body in the retainer by inserting the mounting stud in the slot of the retainer. Then the arm is fastened for the retainer to hold the body. With this arrangement, however, it is difficult to insert the mounting stud into the slot located inside the airbag, since the slot is not visible. Therefore, the assembling work of the inflator is not easy, either.

SUMMARY OF THE INVENTION

The present invention contemplates to solve the above-mentioned problems, and therefore, has an object to provide an inflator which is assembled easily even if a retainer is located inside a folded airbag, and thus facilitates a folding work of the airbag.

The inflator according to the present invention is disposed inside an airbag for airbag device for supplying inflation gas. The inflator includes a substantially cylindrical body for generating inflation gas, and a substantially tubular retainer made of sheet metal for being mounted around the body. The retainer includes a mounting member for mounting the airbag to a predetermined mounting position, a fastening portion, a first support portion and a second support portion. The fastening portion is fastened on the body set in the retainer by being plastically deformed and recessed inward such that the retainer holds the body. While the fastening portion is located in the vicinity of one end of the retainer, the fastening portion, the first support portion and the second support portion are arranged in order along axial direction of the body to abut against a circumference of the body, such that the retainer holds the body at least at three axial positions by the fastening portion, the first support portion and the second support portion. Furthermore, the fastening portion and the second support portion are located in a substantially opposite area from the first support portion in the circumference of the body based on a center of a cross section of the body taken perpendicularly to the axial direction of the body as the retainer holds the body.

In the inflator of the present invention, the fastening portion is located at an end of the retainer. This allows the retainer to be inserted into the airbag while the fastening portion is exposed out of the airbag, and further enables the airbag to be folded up in that state. Moreover, since the fastening portion is exposed out of the airbag after the airbag is folded up, the inflator body can be inserted into the retainer, and the fastening portion exposed out of the airbag can be fastened directly, not from outside of the airbag. Accordingly, the inflator body is easily joined with the retainer having been put in the folded airbag without damaging the airbag. In addition, the body is easily set in the retainer merely by inserting the body into the retainer.

Moreover, the retainer arranges the fastening portion, the first support portion and the second support portion along the axial direction of the inflator body to abut against the circumference of the inflator body. In the circumference of the inflator body based on a center of a cross section of the body taken perpendicularly to the axial direction of the body as the retainer holds the body, the fastening portion and the second support portion are located in a substantially opposite area from the first support portion. Accordingly, when the fastening portion is fastened after the retainer is set in the body, the inflator body functions as a lever. More particularly, the fastening portion serves as effort-point, the first support portion serves as a fulcrum, and the second support portion serves as an application-point, such that the second support portion is pressed onto the body. In other words, the inflator body is stably supported at least at three positions in the axial direction by the fastening portion, and the first and second support portions.

Of course, although the retainer includes amounting means, the retainer is located inside the airbag smoothly since it is inserted into the airbag before being folded up.

Therefore, in the inflator of the present invention, the inflator body is easily joined with the retainer even if the retainer has already been put in the folded airbag. Moreover, the folding work of the airbag is facilitated since the airbag is folded up in a state only the retainer is inside the airbag before the inflator body is inserted into the airbag.

In the above inflator, it is desired that the fastening portion is projected from the airbag when the inflator is inserted and located in the airbag. At this time, it is sufficient that the fastening portion is exposed outside of the airbag upon fastening the fastening portion. Accordingly, for example, it will be appreciated that an airbag is folded in a state an entire retainer except the mounting means is disposed inside the airbag, the inflator body is inserted into the retainer from a predetermined insert hole of the airbag, and that the fastening portion located at the end of the inflator disposed proximate to the insert hole is exposed by turning back an edge of the insert hole of the airbag, and then fastening work is applied. Thereafter, the edge portion of the insert hole is restored.

However, if the inflator is configured so that the fastening portion of the retainer is projected from the airbag in the folding step of the airbag, too, the assembling work of the airbag device is even more facilitated since there is no need to turn over and restore the edge of the insert hole of the airbag.

If gas discharge ports of the body are located at an end of the body apart from the fastening portion such that inflation gas is fed to the airbag from a location apart from the fastening portion, inflation gas is prevented from unexpectedly flowing out in the course of inflation after the inflator body is inserted into the retainer having been already disposed in the airbag from the insert hole of the airbag, even if the insert hole is not closed.

If the retainer includes a positioning projection for positioning the inflator body in the retainer by abutting against the body when the body is inserted into the retainer from a side of the fastening portion before fastened, moreover, the inflator body is easily positioned in the retainer which is disposed invisibly in the airbag when abutting against the positioning projection, which facilitates the assembling work of the airbag device.

It is desired that the second support portion is located in the vicinity of an end of the retainer apart from the other end having the fastening portion. With this construction, the inflator body is held in the longest span by the fastening portion and the second support portion each of which is located in the vicinity of end of the retainer. Therefore, the retainer holds the body stably.

Moreover, it is desired that the first support portion is located substantially in an axial middle position in the retainer. With this construction, the first support portion is proximate a middle position between the fastening portion and the second support portion, and therefore, the retainer holds the body well-balancedly.

Moreover, it is desired that the first support portion and the second support portion are beads that are made by pressing a sheet metal forming the retainer. With this construction, the first and second support portions are easily made by pressing work.

It will also be appreciated that at least one of the fastening portion, the first support portion, or the second support portion includes two contact points that project inward to contact the circumference of the inflator body and are arranged along a circumferential direction of the retainer. With this construction, two contact points hold the body, so that the body is prevented from being dislocated in a direction perpendicular to the axial direction, and is held by the retainer stably.

DESCRIPTION OF THE PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
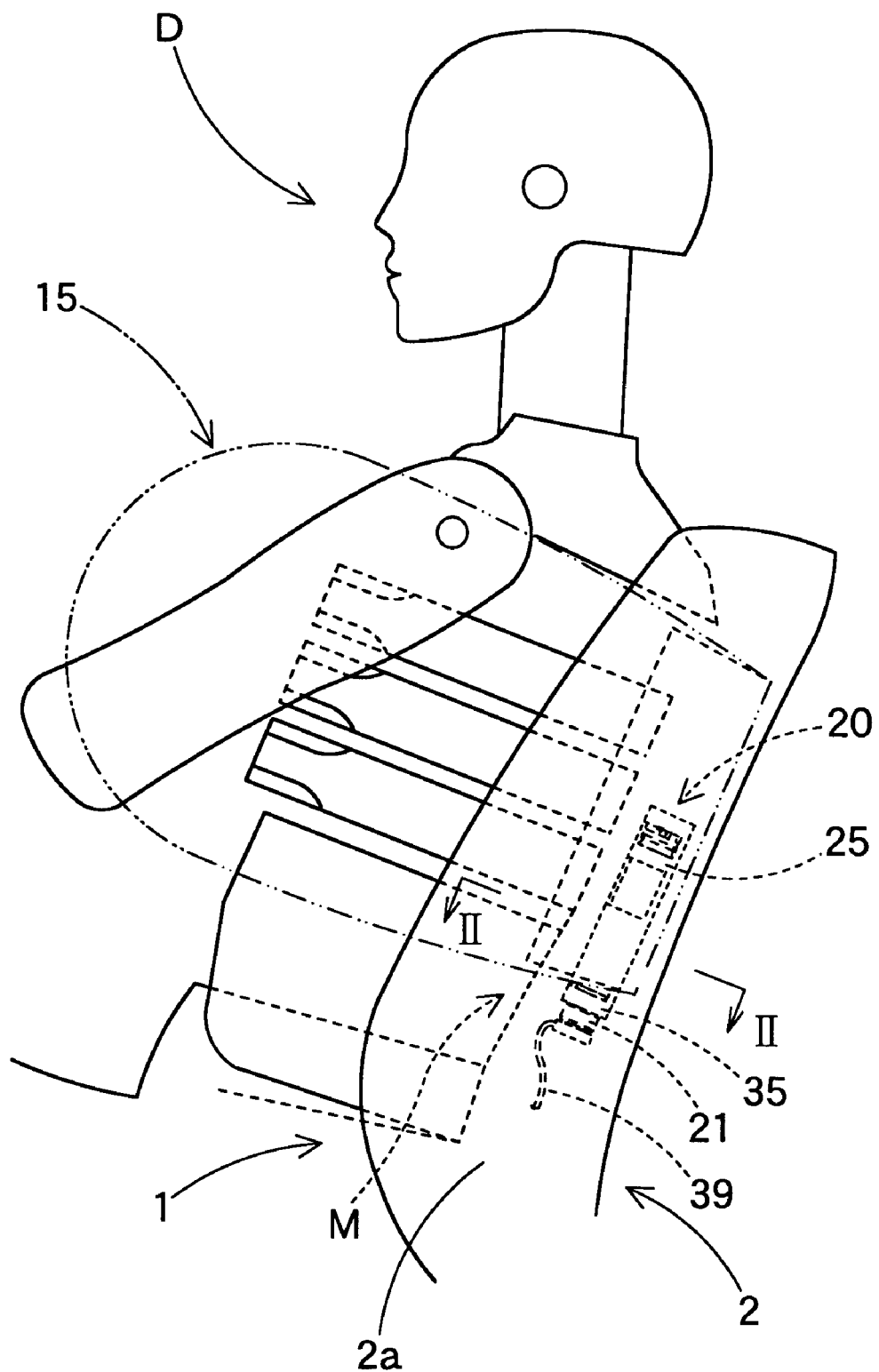
FIG. 1 illustrates a side impact airbag device employing an inflator according to the present invention in service.
Figure 2:
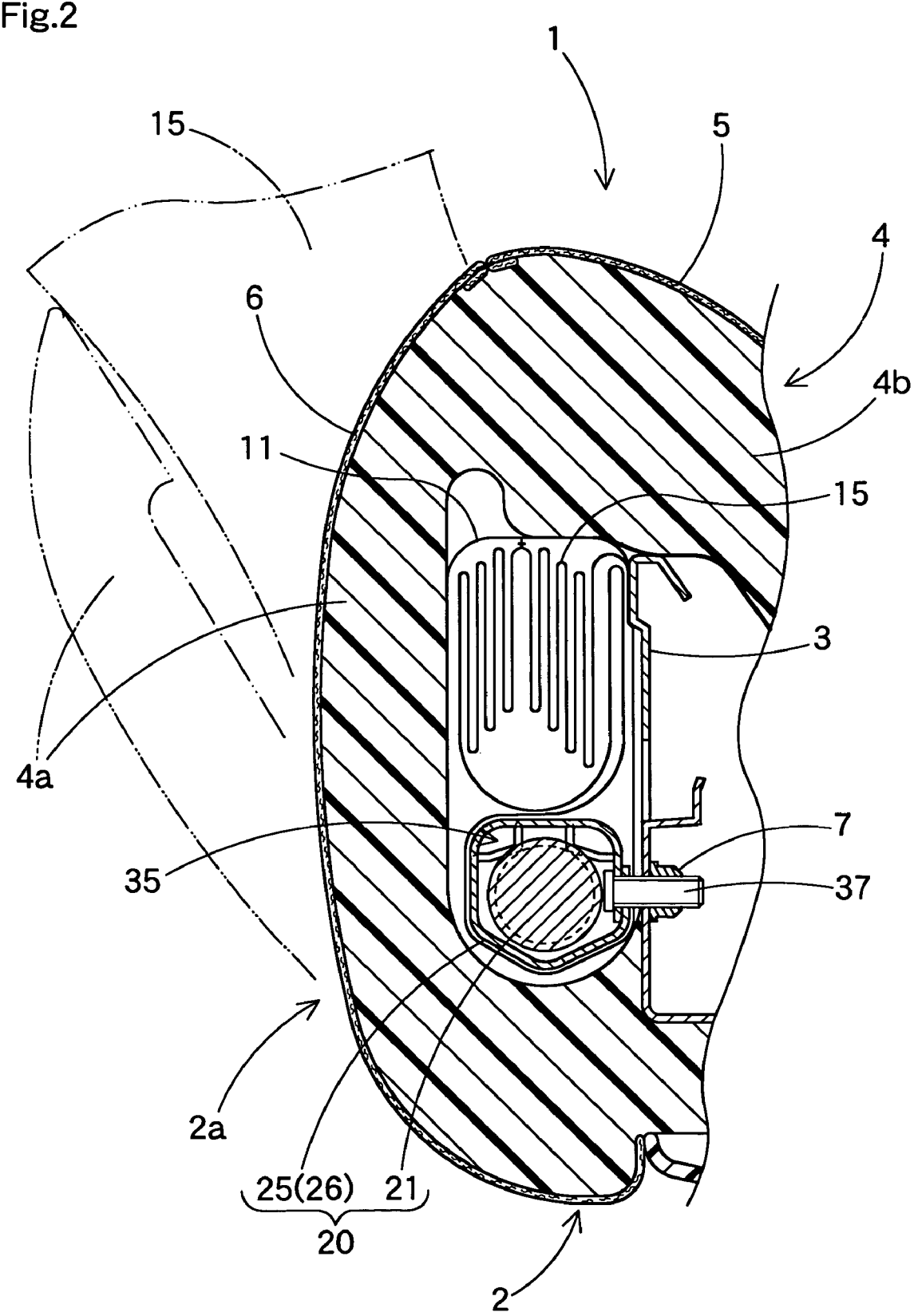
FIG. 2 is a schematic cross section of the side impact airbag device of FIG. 1, taken along line II-II of FIG. 1.

FIGS. 1 and 2 illustrate an embodiment of the inflator 20 of the present invention. The inflator 20 is part of a side impact airbag device M located in an exterior side 2a of a seat back portion 2 of a seat 1.

The seat back portion 2 includes a seat frame 3 which is arranged generally vertically, and the side impact airbag device M is secured to the seat frame 3 by a later-described retainer 25 by bolts 37 and nuts 7. In FIG. 2, a member with reference numeral 4 is a cushion, and members with reference numerals 5 and 6 are surface skins made of decoration fabric or the like. A left edge portion 4a of the cushion 4 covers the side impact airbag device M from front part to vehicle's exterior part. Upon deployment of an airbag 15, the edge portion 4a is pushed by the airbag 15 and separated from a center part 4b of the cushion 4.

The side impact airbag M includes an airbag 15, and an inflator 20 arranged inside the airbag 15 for supplying the airbag 15 with inflation gas.

Figure 7A:
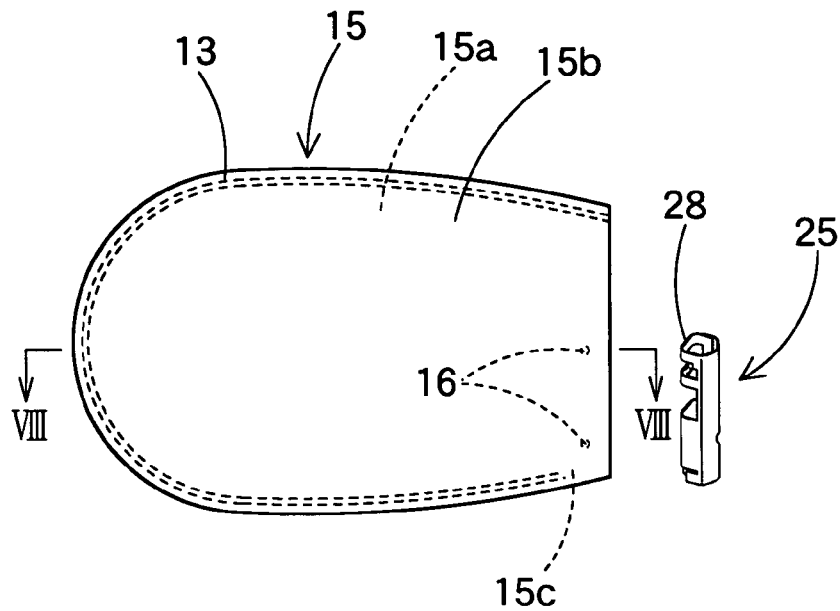
FIGS. 7A to 7D illustrate assembling processes of the inflator of FIG. 3 to an airbag in order.
Figure 7C:
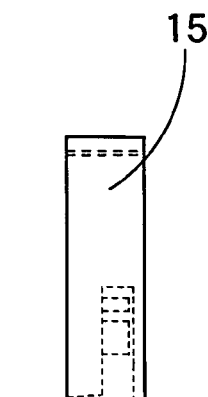
Figure 7B:
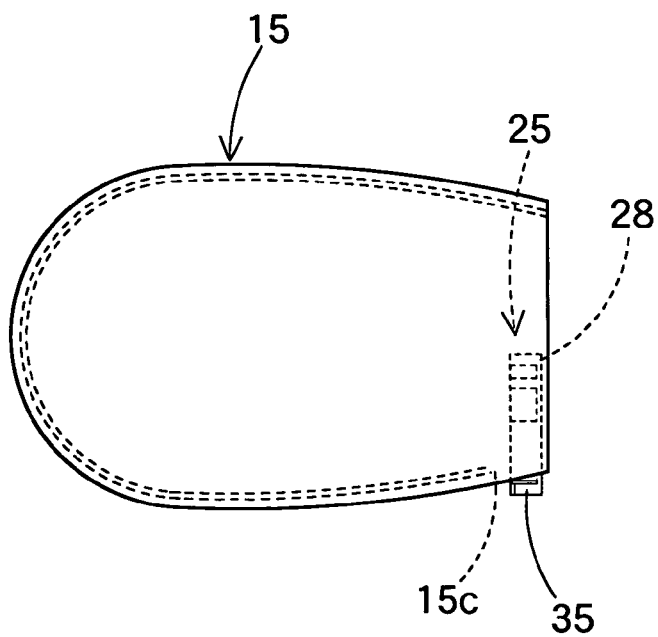
Figure 7D:
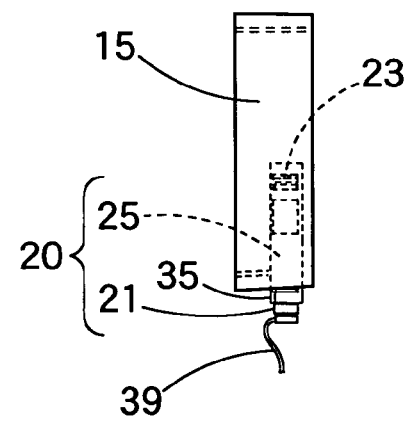
Figure 8:
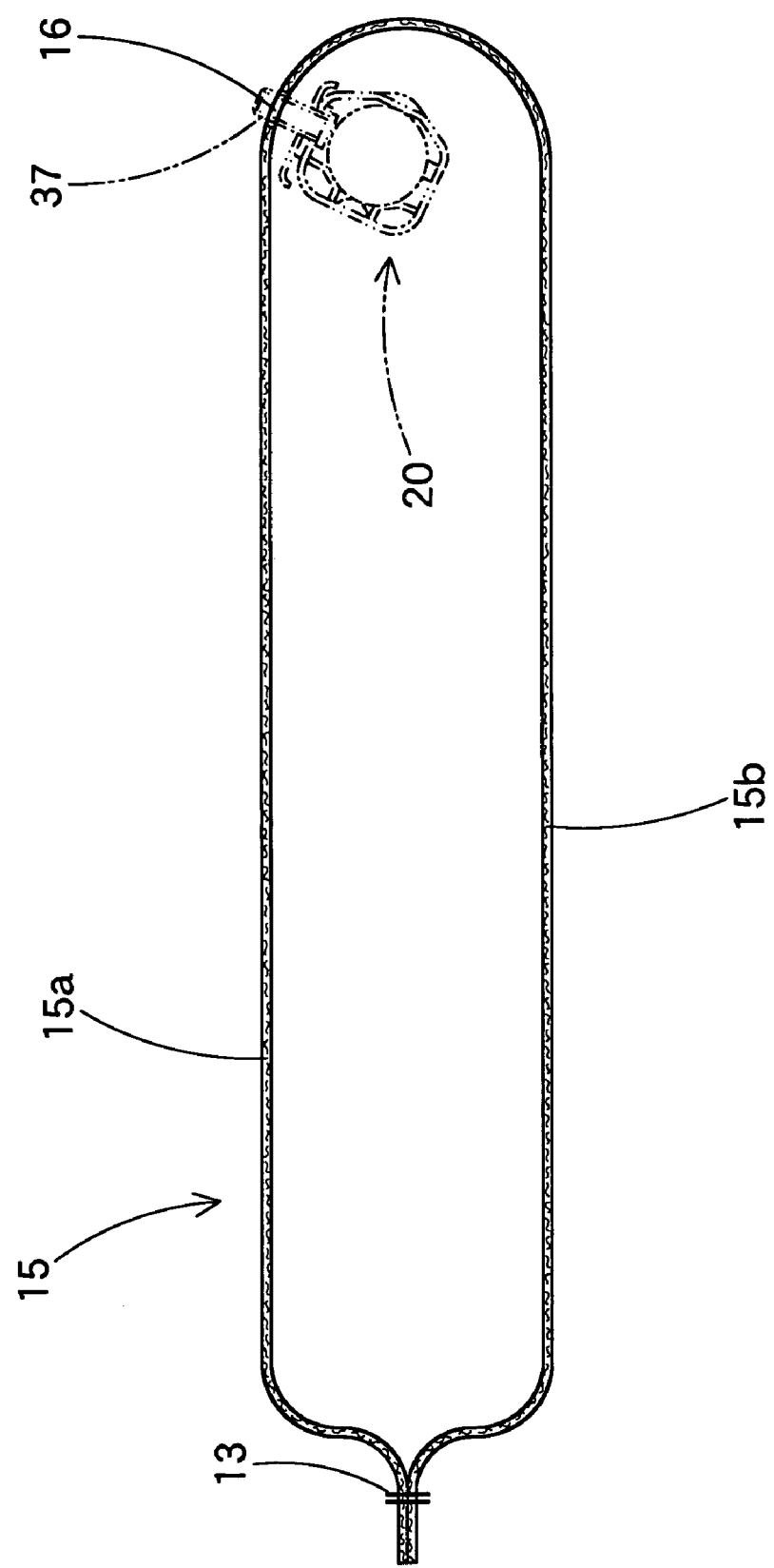
FIG. 8 is a sectional view of the airbag of FIG. 7, taken along line VIII-VIII of FIG. 7A.

As shown in FIGS. 1, 7 and 8, the airbag 15 is made into a bag shape including an interior wall 15a and an exterior wall 15b, and is adapted to protect breast of an occupant D (FIG. 1 shows a dummy) seated in the seat 1 upon deployment. Upon deployment of the airbag 15, the inflator 20 is located at a rear end of the airbag 15. In a rear end part of the interior wall 15a of the airbag 15 are two through holes 16 for allowing bolts 37 of the retainer 25 of the inflator 20 to protrude therefrom. The airbag 15 is made of a single piece of fabric of polyester, polyamide or the like. This fabric is folded in two forward at a position corresponding to a rear end of the completely inflated airbag 15, and then is stitched up at overlaid outer edges by stitching yarn 13, and thus the airbag 15 is formed.

When the outer edges of the fabric are stitched up, a portion corresponding to a rear lower end of the completely deployed airbag 15 is left unstitched. This unstitched portion serves as an insert hole 15c for inserting the retainer 25 of the inflator 20 into the airbag 15 therefrom.

Although seam allowances in the outer edge of the airbag 15 are exposed on surface in the illustrated embodiment, the airbag 15 may be so configured as not to expose the seam allowances outside, by turning over the airbag 15 utilizing the insert hole 15c, for example.

Moreover, although the insert hole 15c of the airbag 15 is formed in a lower part proximate the rear end, the insert hole 15c may be formed in an upper part proximate the rear end of the airbag 15. In that case, a later-described fastening portion 35 of the inflator 20 is arranged to protrude upward from the upper portion proximate the rear end of the airbag 15, contrarily to the illustrated embodiment.

As shown in FIGS. 2 to 6, the inflator 20 includes a substantially cylindrical body 21 for generating inflation gas, and a substantially tubular retainer 25 made of sheet metal. The retainer 25 is mounted around the inflator body 21 to hold the body 21, and includes bolts 37 as mounting means for mounting the airbag 15 on a predetermined position of the seat back 2.

The inflator body 21 includes a substantially cylindrical greater diameter portion 22 and a small diameter portion 23 projected from one end face (or an end face oriented upward when the inflator 20 is mounted on the seat back 2) of the greater diameter portion 22. The small diameter portion 23 includes a plurality of gas discharge ports 23a for discharging inflation gas when actuated. In the other end portion of the greater diameter portion 22 is a connector portion 22a for joining a harness 39 thereto for connection with an airbag actuating circuit. In the vicinity of the connector portion 22a of the greater diameter portion 22 is a recessed portion 22b on which a fastening portion 35 of the retainer 25 is fastened. The harness 39 includes a connector 39a located at an end of its lead wire 39b to be connected to the connector portion 22a.

The retainer 25 includes a tubular portion 26 made of sheet metal and two bolts 37 secured to the tubular portion 26 as mounting means. The bolts 37 line up along axial direction of the tubular portion 26, and project inward of the vehicle when the retainer 25 is mounted on the seat back 2.

Figure 3:
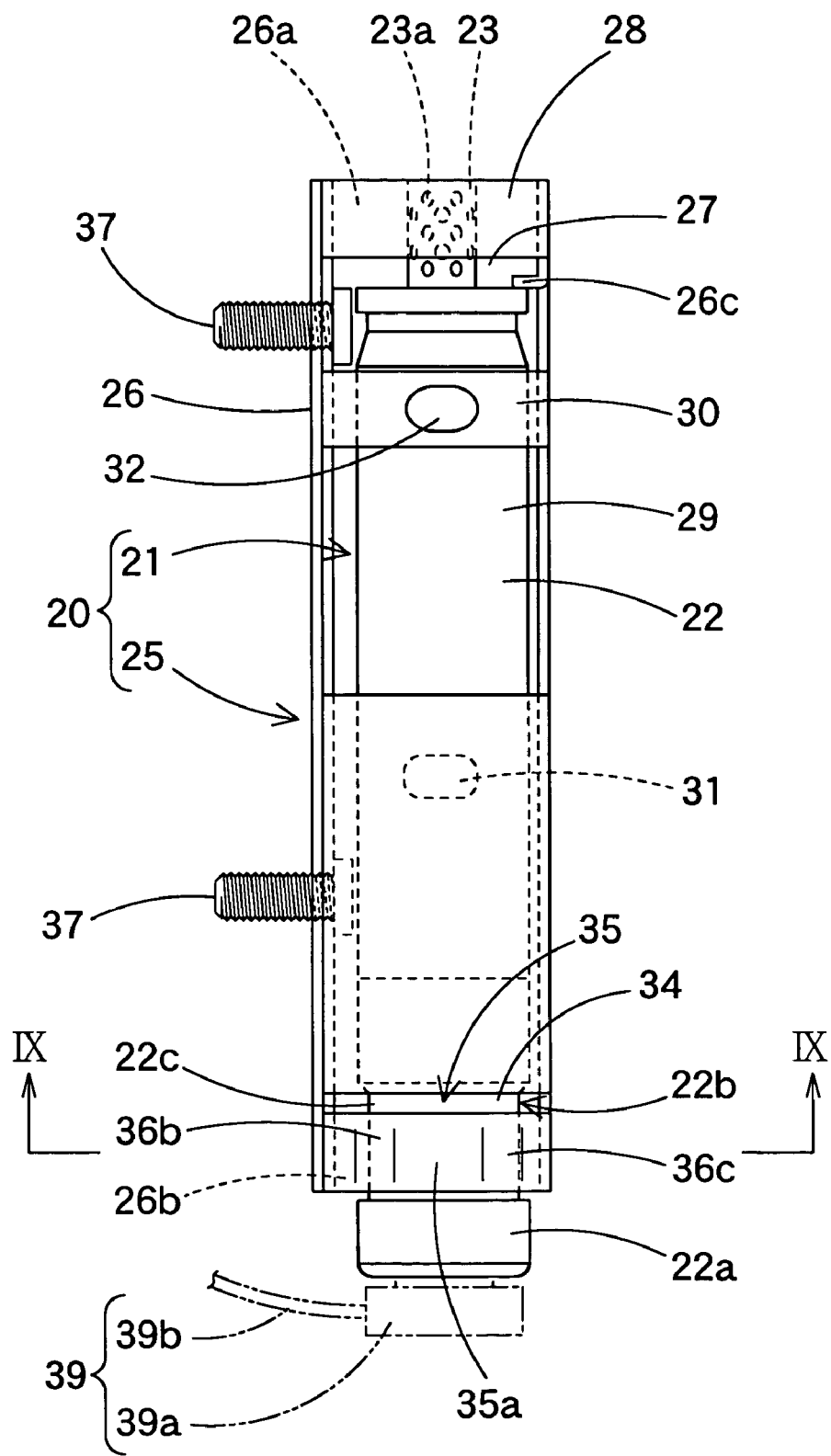
FIG. 3 is a front view of an embodiment of the inflator of the present invention.
Figure 5:
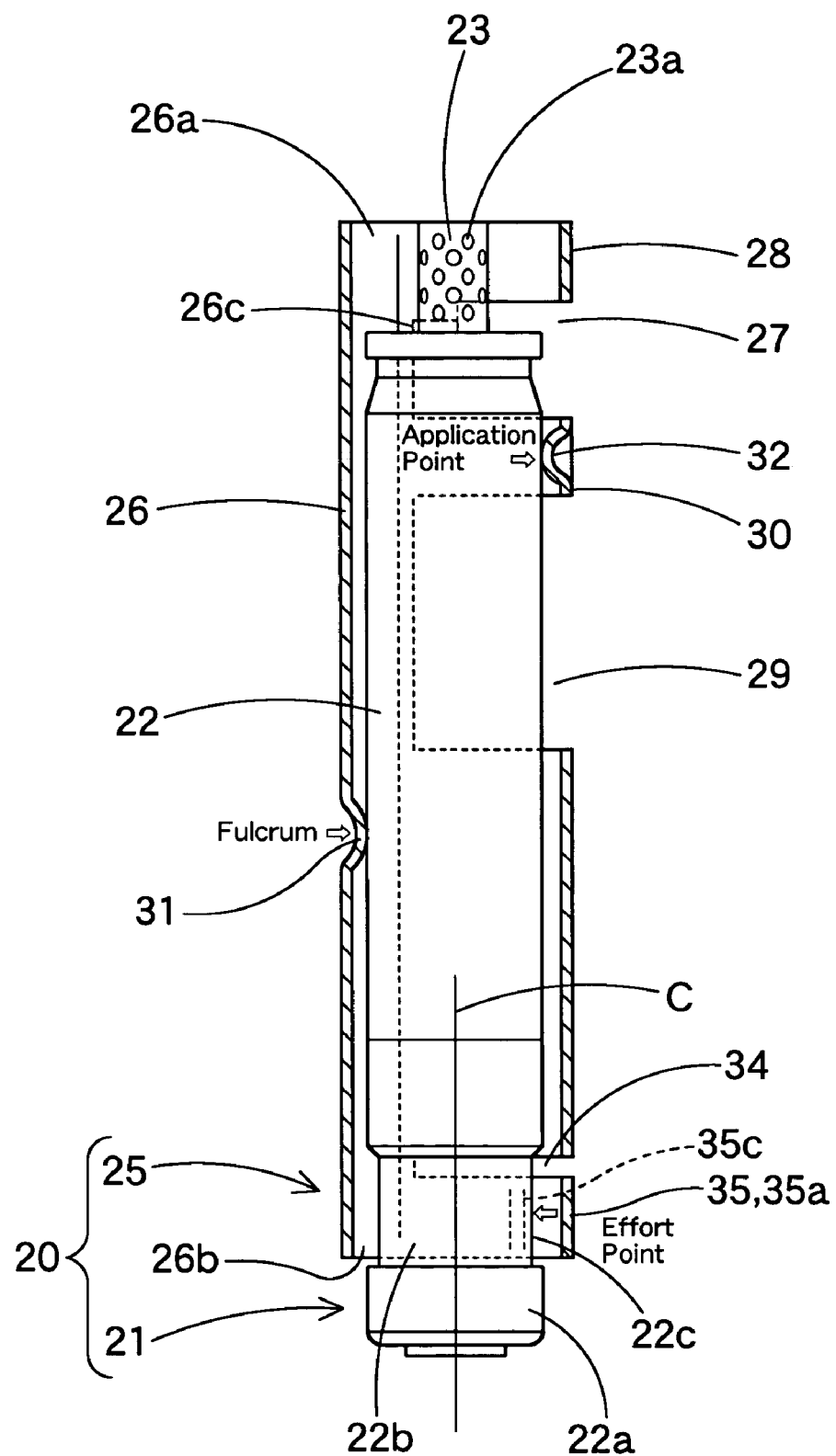
FIG. 5 is a schematic vertical section of the inflator of FIG. 3, taken along line V-V of FIG. 4.
Figure 6:
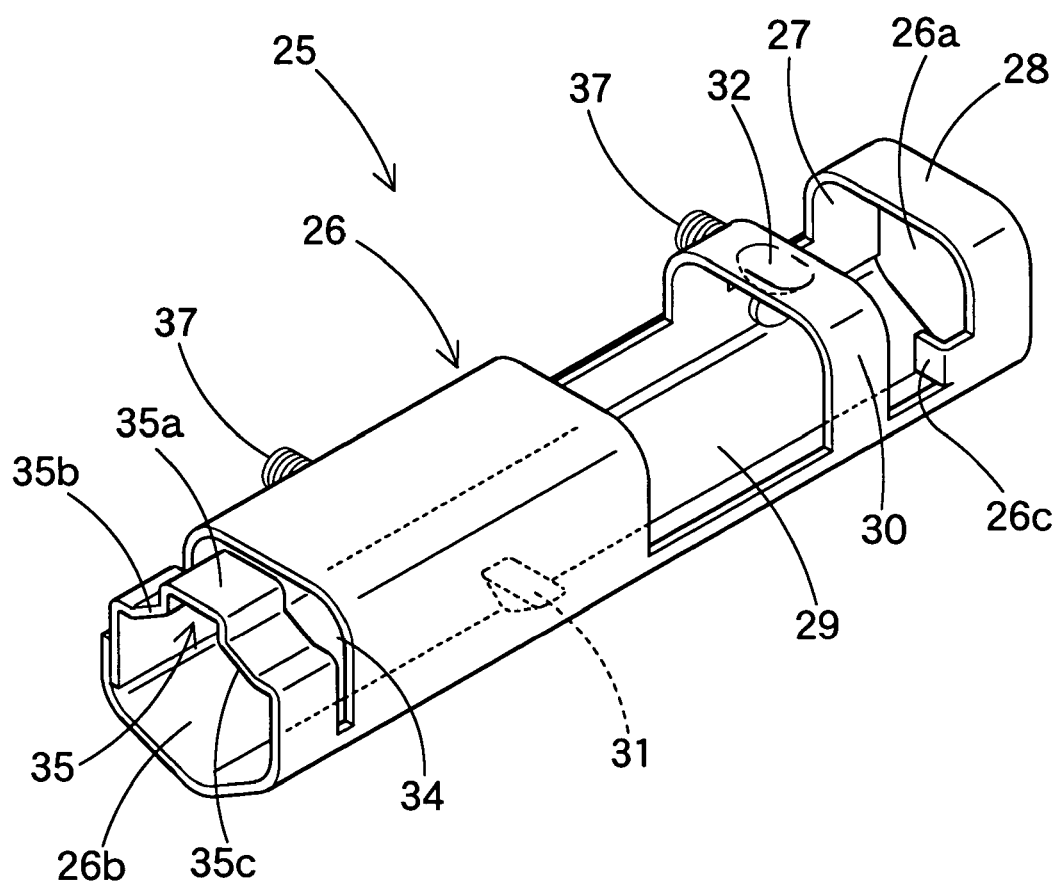
FIG. 6 is a perspective view of a retainer of the inflator of FIG. 3.

The tubular portion 26 has openings 26a and 26b in its axial ends, and includes three apertures 27, 29 and 34 in its circumference, in descending order as mounted on the seat back 2 as shown in FIGS. 3, 5 and 6. The uppermost aperture 27 serves as a gas outlet port 27 for letting out inflation gas from the gas discharge ports 23a, and the middle aperture 29 serves as a lightening hole 29 for weight reduction. The lowermost aperture 34 serves as a slit 34 for providing the fastening portion 35. These apertures 27, 29 and 34 are mainly opened forward and toward exterior of the vehicle as the inflator 20 is mounted on the seat back 2. The airbag 15 mounted on the seat 1 is configured to deploy forward at exterior side of the seat 1, as indicated by double-dotted lines in FIG. 2, by inflation gas flown out of the gas outlet port 27 of the retainer 25.

Inflation gas discharged from the gas discharge ports 23a of the inflator body 21 are supplied into the airbag 15 from an upper end opening of the tubular portion 26 serving as a gas outlet port 26a, as well as from the gas outlet port 27. The retainer 25 includes a cover portion 28 between the outlet ports 27 and 26a for covering the gas discharge ports 23a when the body 21 is held by the retainer 25, such that inflation gas is supplied into the airbag 15 dispersedly from the gas outlet port 27 and the gas outlet port 26a.

In a periphery of the gas outlet port 27 is a positioning projection 26c to abut against an end face of the greater diameter portion 22 of the inflator body 21 such that the vicinity of the gas discharge ports 23a stops at a position of the cover portion 28 when the body 21 is inserted from the opening 26b of the retainer 25.

The fastening portion 35 of the retainer 25 is located at an end of the retainer 25 which becomes a lower end as mounted on the seat back 2. The fastening portion 35 includes a knob portion 35a having an inverted U-shaped section, and two clamping portions 35b and 35c. The clamping portions 35b and 35c are located in both sides of the knob portion 35a in a circumference of the tubular portion 26, and are bent inward of the tubular portion 26. The fastening portion 35 is operated by holding the knob portion 35a circumferentially of the tubular portion 26 and plastically deforming the knob portion 35a, such that the clamping portions 35b and 35c are projected inward of the tubular portion 26 and pressed on a bottom face 22c of the recessed portion 22b of the inflator body 21.

Figure 4:
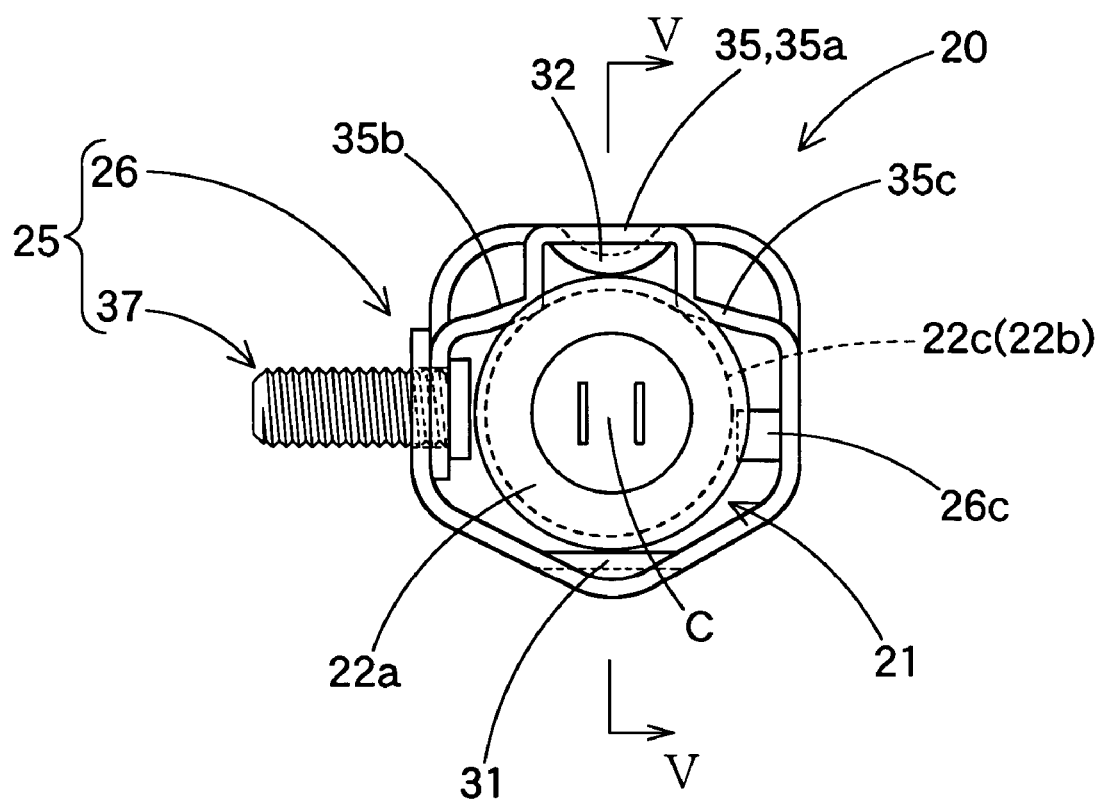
FIG. 4 is a bottom view of the inflator of FIG. 3.

The clamping portions 35b and 35c are located in a vehicle's front part of the outer circumference of the greater diameter portion 22 of the inflator body 21 as mounted on the seat back 2, based on a center C of a section of the body 21 taken perpendicularly to the axis of the body 21 as shown in FIG. 4, when pressed onto the recessed portion bottom face 22c of the body 21.

The tubular portion 26 of the retainer 25 is configured to hold and clamp the inflator body 21 at least at three positions along the axial direction of the body 21 including the clamping portions 35b and 35c of the fastening portion 35.

More specifically, the fastening portion 35, a first support portion 31, and a second support portion 32 are arranged in ascending order to abut against the circumference of the inflator body 21 along the axial direction.

The second support portion 32 is located proximate to an end of the tubular portion 26 apart from the fastening portion 35, in a band portion 30 disposed between the gas outlet port 27 and the lightening hole 29. The first support portion 31 is located generally in a middle position between the fastening portion 35 and the second support portion 32. In the illustrated embodiment, the first and second support portions 31 and 32 are shown as beads recessed inward of the tubular portion 26.

Moreover, in correlation of the clamping portions 35b and 35c of the fastening portion 35, the first support portion 31 and the second support portion 32, the clamping portions 35b and 35c of the fastening portion 35 and the second support portion 32 are located in a substantially opposite area from the first support portion 31 in the circumference of the greater diameter portion 22 of the inflator body 21 based on the center C of a cross section of the body 21 as mounted on the seat back 2. In other words, when the inflator 20 is mounted on the seat back 2, or when the inflator 20 is arranged substantially vertically to locate the small diameter portion 23 at upper end, the clamping portions 35b and 35c and the second support portion 32 are located in an area directed toward vehicle's front, and the first support portion 31 is located in an area directed toward vehicle's rear.

To mount the airbag device M on the vehicle, as shown in FIGS. 7A and 7B, the retainer 25 of the inflator 20 with a side of the cover portion 28 at the head is put in the airbag 15 from the insert hole 15c firstly, such that the bolts 37 are projected out of the airbag 15 from through holes 16. At this time, the fastening portion 35 of the retainer 25 is left exposed outside of the airbag 15.

Then as shown in FIGS. 7B and 7C, the airbag 15 is folded. After folding the airbag 15, a breakable wrapping sheet 11 as shown in FIG. 2 is wrapped around the airbag 15 for keeping folded-up configuration. In folding the airbag 15, the fastening portion 35 of the retainer 25 is kept exposed. The fastening portion 35 is kept exposed when the airbag 15 is wrapped by the wrapping sheet 11.

Figure 9A:
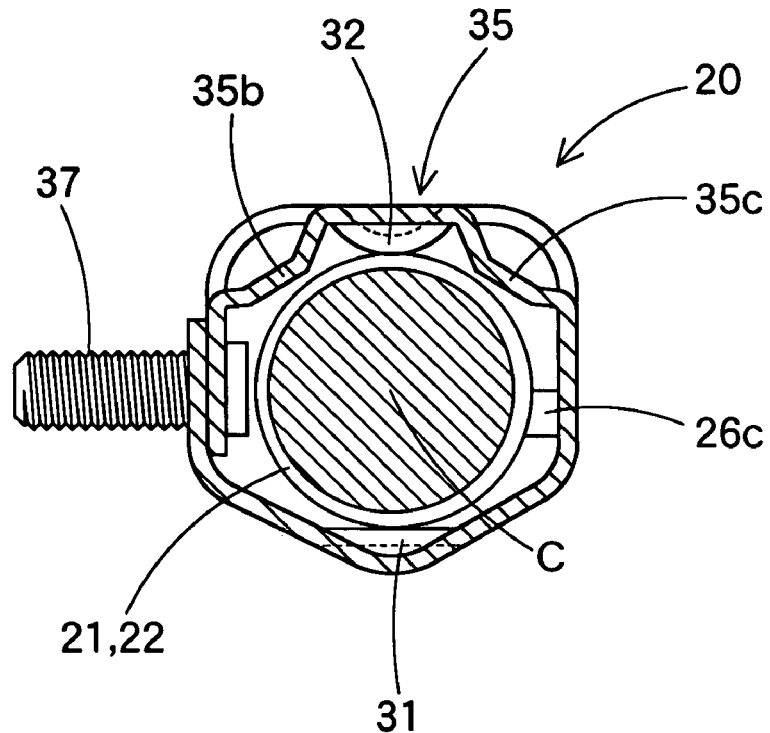
FIGS. 9A and 9B illustrate a fastening state of a fastening portion of the retainer in the inflator of FIG. 3, which correspond to line IX-IX of FIG. 3.
Figure 9B:
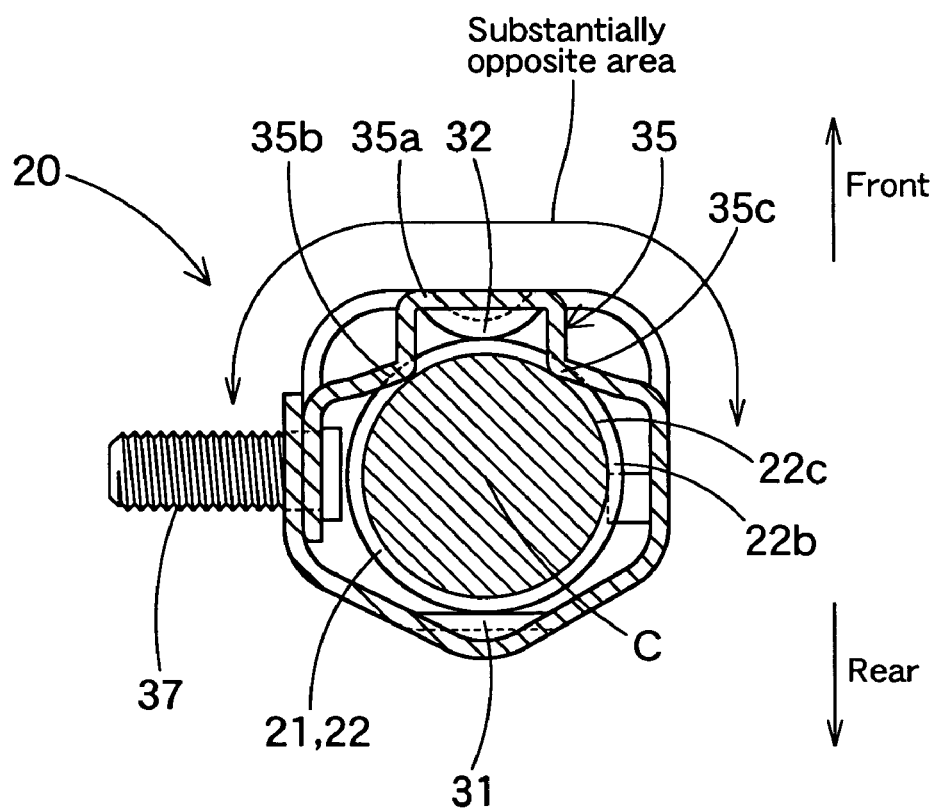

Then as shown in FIGS. 7C and 7D, the inflator body 21 with the small diameter portion 23 at the head is inserted into the retainer 25 from the opening 26b of the retainer 25 until an end face of the greater diameter portion 22 abuts against the positioning projection 26c. As shown in FIGS. 9A and 9B, subsequently, the knob portion 35a of the fastening portion 35 of the retainer 25 are held and plastically deformed, so that the clamping portions 35b and 35c of the fastening portion 35 and the first and second support portions 31 and 32 are pressed onto the circumference of the greater diameter portion 22 of the inflator body 21. Thus the body 21 is held by the retainer 25 and an assembling work of the airbag device M is completed. The harness 39 is preliminarily connected to the body 21.

The airbag device M thus assembled is mounted on the seat back 2 of the seat 1 by fastening the bolts 37 into nuts 7 on the seat frame 3. After the mounting of the airbag device M, the seat 1 is covered by the surface skins 5 and 6 to finish, and is mounted on the vehicle. In mounting the seat 1 on the vehicle, the harness 39 leading from the inflator body 21 is connected to a predetermined airbag actuating circuit of the vehicle.

When predetermined signals are inputted to the inflator body 21 through the harness 39 after the side impact airbag device M is mounted on the vehicle, inflation gas is discharged from the gas discharge ports 23a of the inflator body 21. Then the airbag 15 breaks the wrapping sheet 11, pushes the edge portion 4a of the cushion 4 to open separated from the center portion 4b, and deploys as indicated by double-dotted lines in FIGS. 1 and 2.

In the inflator 20 of the side impact airbag device M according to the present invention, the fastening portion 35 is located at an end of the retainer 25. This enables the fastening portion 35 of the retainer 25 to be exposed out of the airbag 15 when inserting the retainer 25 into the airbag 15 from the insert hole 15c, and further enables the airbag 15 to be folded up in that state. Moreover, since the fastening portion 35 is exposed out of the airbag 15 after the airbag 15 is folded up, the inflator body 21 can be inserted into the retainer 25 from the opening 26b, and the knob portion 35a of the fastening portion 35 exposed out of the airbag 15 can be fastened directly, not from outside of the airbag 15. Accordingly, the inflator body 21 is easily joined with the retainer 25 having been put in the folded airbag 15 without damaging the airbag 15. In addition, the body 21 is easily set in the retainer 25 merely by inserting the body 21 into the retainer 25.

Moreover, the retainer 25 includes the clamping portions 35b and 35c of the fastening portion 35 and the first and second support portions 31 and 32 all of which are arranged along the axial direction of the inflator body 21 to abut against the circumference of the greater diameter portion 22. In the circumference of the greater diameter portion 22 of the inflator body 21 based on the center C of a cross section of the body 21 as mounted on the seat back 2, the clamping portions 35b and 35c of the fastening portion 35 and the second support portion 32 are located in a substantially opposite area from the first support portion 31. Accordingly, when the knob portion 35a of the fastening portion 35 is plastically deformed and recessed inward to assemble the inflator body 21 with the retainer 25, the inflator body 21 functions as a lever. As shown in FIG. 5, more specifically, the clamping portions 35b and 35c of the fastening portion 35 serves as effort-point, the first support portion 31 serves as a fulcrum, and the second support portion 32 as an application-point, such that the second support portion 32 is pressed onto the body 21. In other words, the inflator body 21 is stably supported at least at three positions in the axial direction by the clamping portions 35b and 35c of the fastening portion 35, and the first and second support portions 31 and 32.

Of course, although the retainer 25 includes the bolts 37 as mounting means projected outward radially, the retainer 25 is located inside the airbag 15 smoothly since it is inserted into the airbag 15 before being folded up.

Therefore, in the inflator 20 in the foregoing embodiment, the inflator body 21 is easily joined with the retainer 25 even if the retainer 25 has already been put in the folded airbag 15. Moreover, the folding work of the airbag 15 is facilitated since the airbag 15 is folded up in a state only the retainer 25 is inside the airbag 15 before the inflator body 21, which generates inflation gas, is inserted into the airbag 15.

As an inflator 20, it is sufficient that the fastening portion 35 of the retainer 25 is exposed outside of the airbag upon fastening the fastening portion 35. Accordingly, for example, it will also be appreciated that an airbag is folded in a state an entire retainer 25 except bolts 37 as mounting means is disposed inside the airbag, the inflator body 21 is inserted into the retainer 25 from a predetermined insert hole of the airbag, and that the fastening portion 35 located at an end portion of the inflator 20 disposed proximate to the insert hole is exposed by turning back an edge of the insert hole of the airbag, and then fastening work is applied. Thereafter, the edge of the insert hole of the airbag is restored.

However, if the inflator 20 is configured so that the fastening portion 35 of the retainer 25 is projected from the airbag 15 in the folding step of the airbag 15, as in the foregoing embodiment, the assembling work of the airbag device M is even more facilitated since there is no need to turn over and restore the edge of the insert hole 15c of the airbag 15.

Moreover, in the body 21 of the inflator 20 of the foregoing embodiment, the gas discharge ports 23a are located at an end side, i.e., at upper end side apart from the fastening portion 35 so that inflation gas is supplied into the airbag 15 from the openings 26a and 27 located in the upper end vicinity apart from the fastening portion 35. Accordingly, after the inflator body 21 is inserted into the retainer 25 having been already disposed in the airbag 15 from the insert hole 15c of the airbag 15, even if the insert hole 15c is not closed by stitching or the like, inflation gas does not unexpectedly flows out in the course of inflation. In the foregoing embodiment, the insert hole 15c located apart from the gas discharge ports 23a serves as a vent hole for discharging extra gas after completion of inflation of the airbag 15, and therefore, should not be closed.

With respect to arrangement position of the gas discharge ports 23a, to prevent gas leakage from the insert hole 15c in the course of airbag inflation, the discharge ports 23a are desirably in positions apart from the fastening portion 35 than a middle point of an entire length of the inflator body 21, i.e., in upper end or leading end vicinity, to speak on the basis of the body 21 of the inflator 20. To speak on the basis of the retainer 25, the discharge ports 23a are desirably in positions apart from the fastening portion 35 than the first support portion 31, i.e., in upper end or leading end vicinity. More desirably, the discharge ports 23a are located apart from the fastening portion 35 than the second support portion 32, i.e., in upper end or leading end vicinity.

The retainer 25 of the inflator 20 includes a positioning projection 26c that abuts against an end face of the leading end of the inflator body 21 i.e., an end face of the greater diameter portion 22 located away from the fastening portion 35, when inserted from a side of the fastening portion 35 before fastened, for positioning the body 21 in the retainer 25. Therefore, the inflator body 21 is easily positioned in the retainer 25 which is disposed invisibly in the airbag 15 merely by applying the leading end face to the positioning projection 26c, which facilitates the assembling work of the airbag device M.

Moreover, in the inflator 20, the second support portion 32 of the retainer 25 is located in the vicinity of the other end portion of the retainer 25 opposite from the fastening portion 35. With this construction, the inflator body 21 is held in the longest span between the clamping portions 35b and 35c of the fastening portion 35 and the second support portion 32 each of which is located in the vicinity of end of the retainer 25. Therefore, the retainer 25 holds the body 21 stably.

In the meantime, the first support portion 31 of the retainer 25 is located substantially in the axially middle of the retainer 25. That is, the first support portion 31 is in the vicinity of the middle position between the clamping portions 35b and 35c of the fastening portion 35 and the second support portion 32. Therefore, the retainer 25 holds the retainer 25 well-balancedly.

In addition, the first support portion 31 and the second support portion 32 of the retainer 25 are beads that are made by pressing a sheet metal forming the retainer 25 such that projections are provided. With this construction, the first and second support portions 31 and 32 are easily made by pressing work.

In the inflator 20, the retainer 25 axially holds the inflator body 21 utilizing the fastening portion 35 and the first and second support portions 31 and 32, and the fastening portion 35 has two contact points that contact the circumference of the inflator body 21 as the clamping portions 35b and 35c, while each of the first and second support portions 31 and 32 has one contact point. However, it is sufficient that the clamping portions of the fastening portion 35 and the second support portion 32 are located in substantially opposite area from the first support portion 31 in the circumference of the greater diameter portion 22 of the body 21 based on the center C of a cross section of the body 21 taken perpendicularly to the axial direction of the body 21, and therefore, contact point of the fastening portion 35 and the first and second support portions 31 and 32 to the circumference of the body 21 may be one, or in plurality, including a case that a contact portion is elongate in the circumferential direction of the body 21.

However, if the clamping portions 35b and 35c are provided in two positions in the circumferential direction of the retainer 25 as in the fastening portion 35 of the foregoing embodiment, the clamping portions 35b and 35c hold the body 21 at two points, so that the body 21 is prevented from being dislocated in a direction perpendicular to the axial direction, and the retainer 25 holds the body 21 stably. At this time, a circumferential middle point between the clamping portions 35b and 35c is located in substantially opposite point from the first support portion 31 in the circumference of the body 21 based on the center C of a cross section of the body 21 taken perpendicularly to the axial direction of the body 21.

Figure 10:
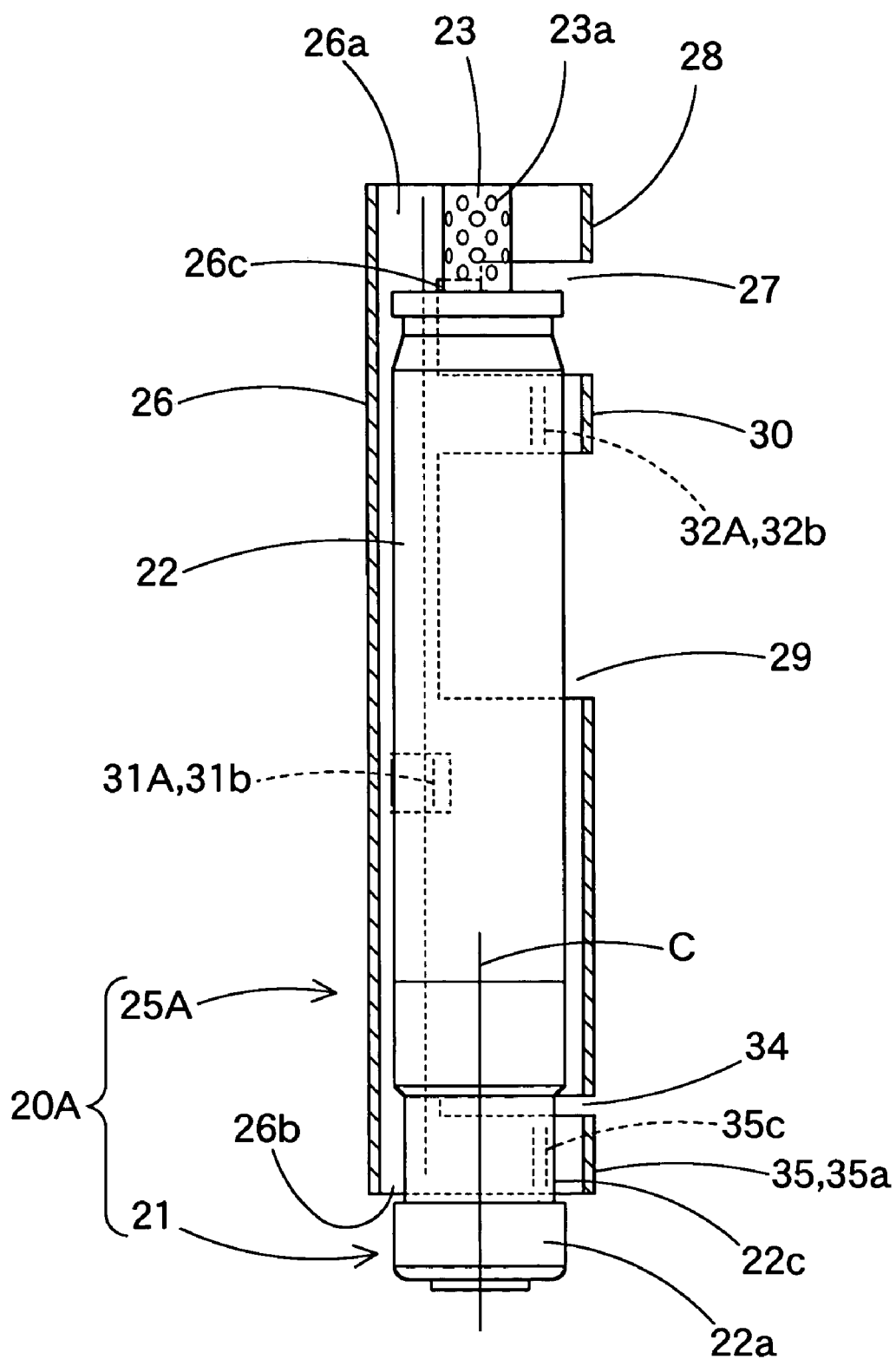
FIG. 10 is a schematic vertical section of another embodiment of the inflator.
Figure 11:
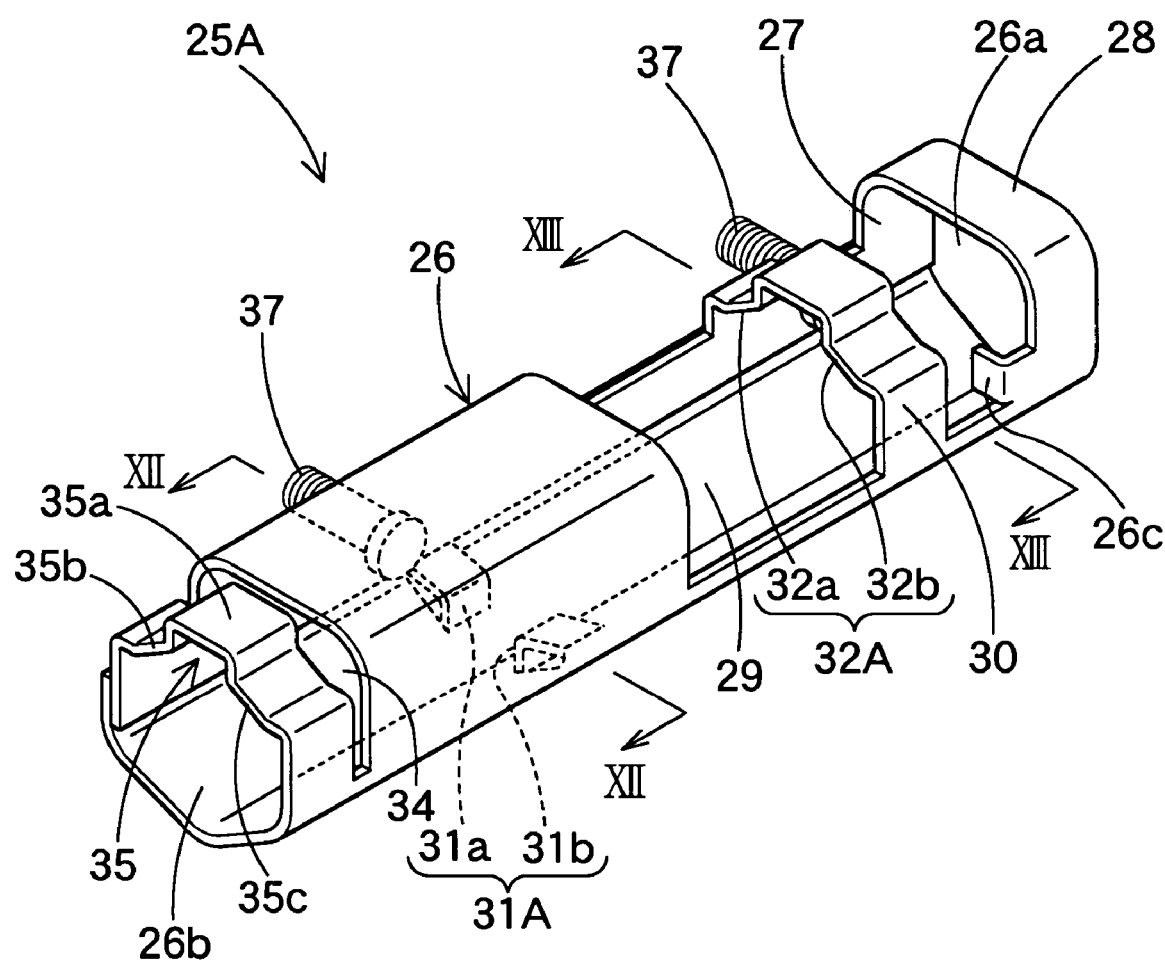
FIG. 11 is a perspective view of a retainer of the inflator of FIG. 10.
Figure 12:
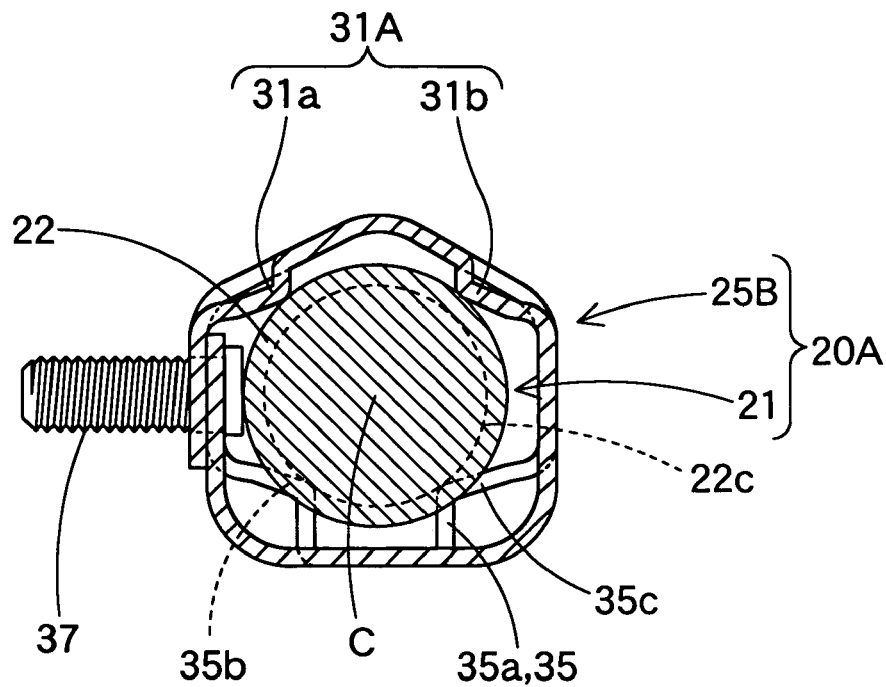
FIG. 12 is a schematic cross section of the inflator of FIG. 10, taken along line XII-XII of FIG. 11.
Figure 13:
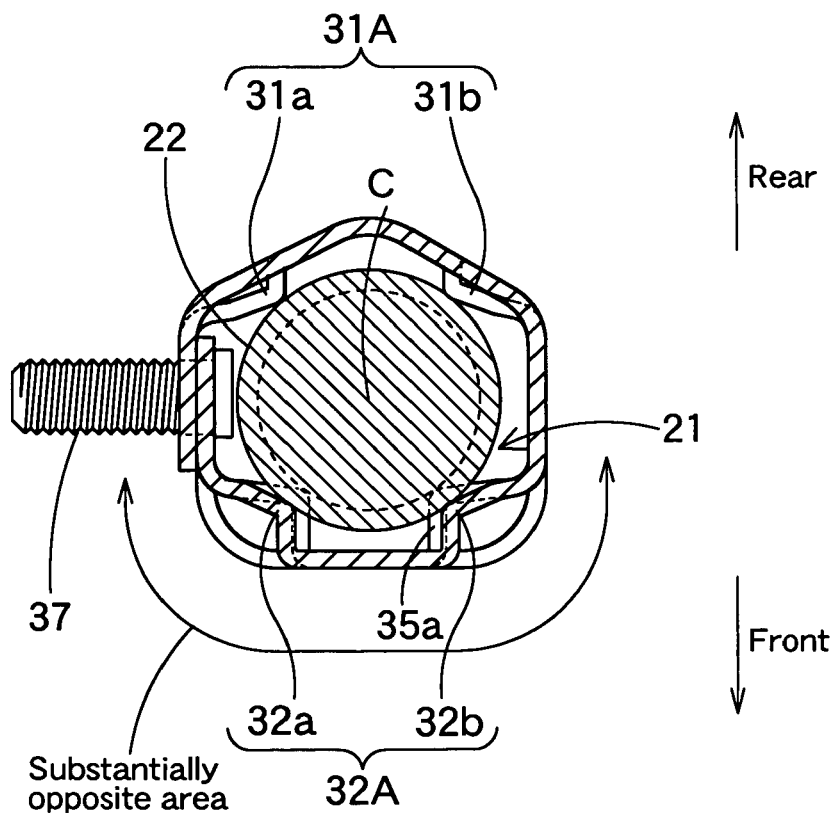
FIG. 13 is a schematic cross section of the inflator of FIG. 10, taken along line XIII-XIII of FIG. 11.
Figure 14:
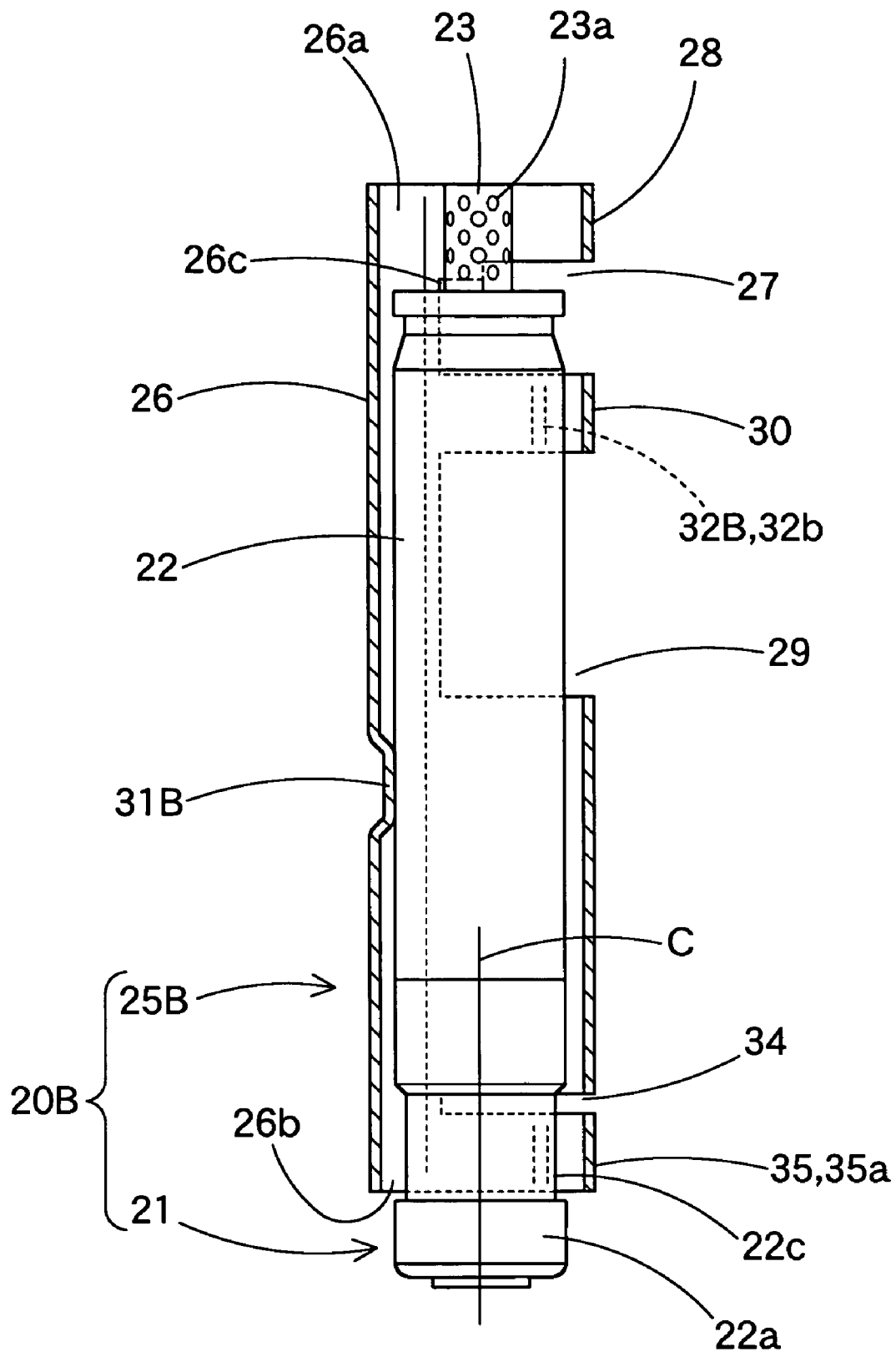
FIG. 14 is a schematic vertical section of yet another embodiment of the inflator.
Figure 15:
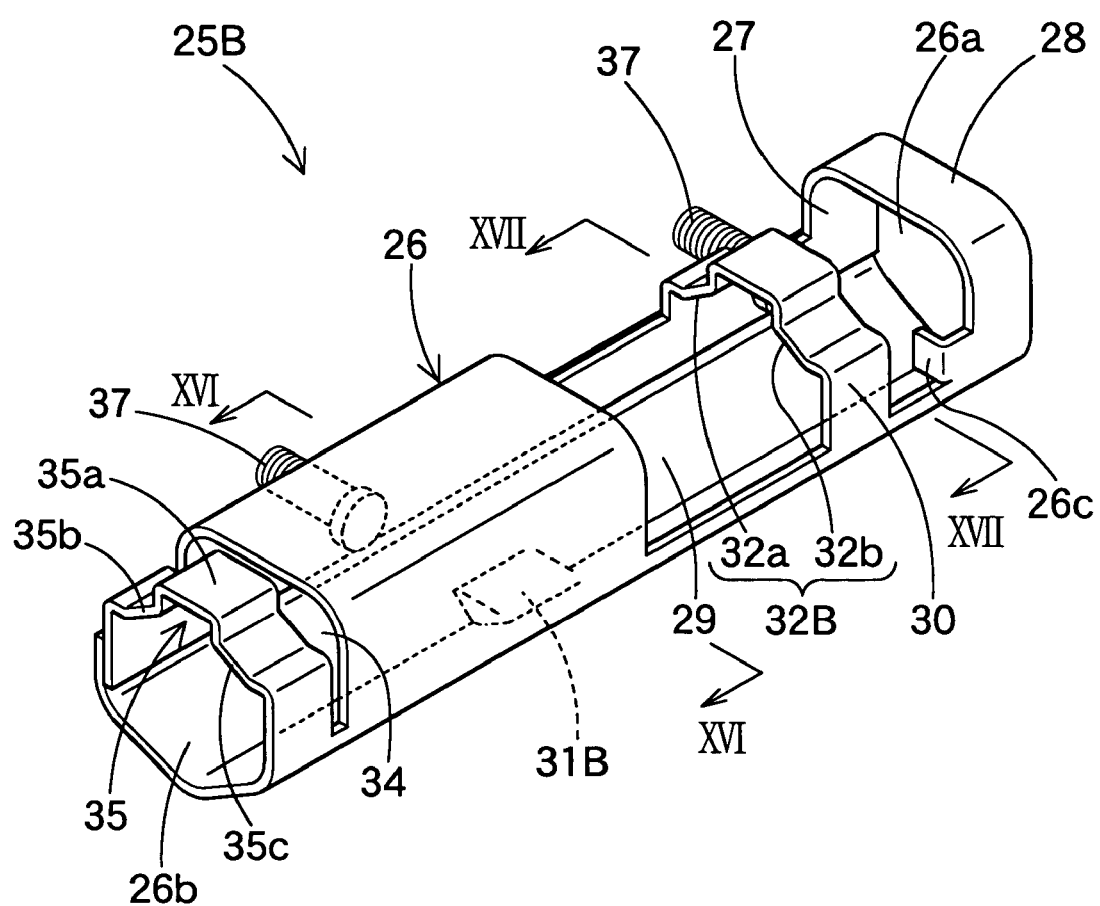
FIG. 15 is a perspective view of a retainer of the inflator of FIG. 14.
Figure 16:
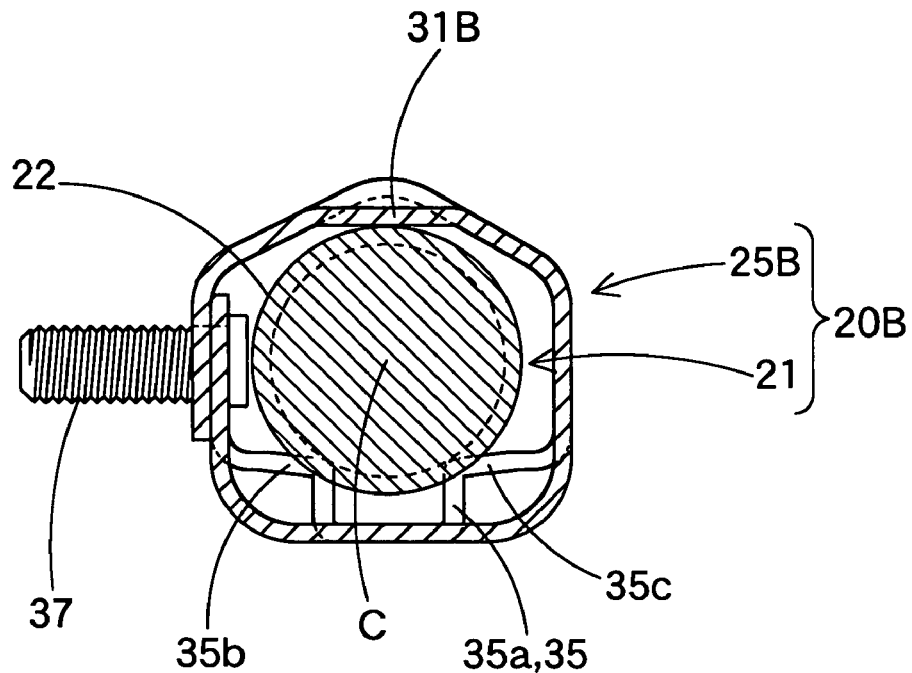
FIG. 16 is a schematic cross section of the inflator of FIG. 14, taken along line XVI-XVI of FIG. 15.
Figure 17:
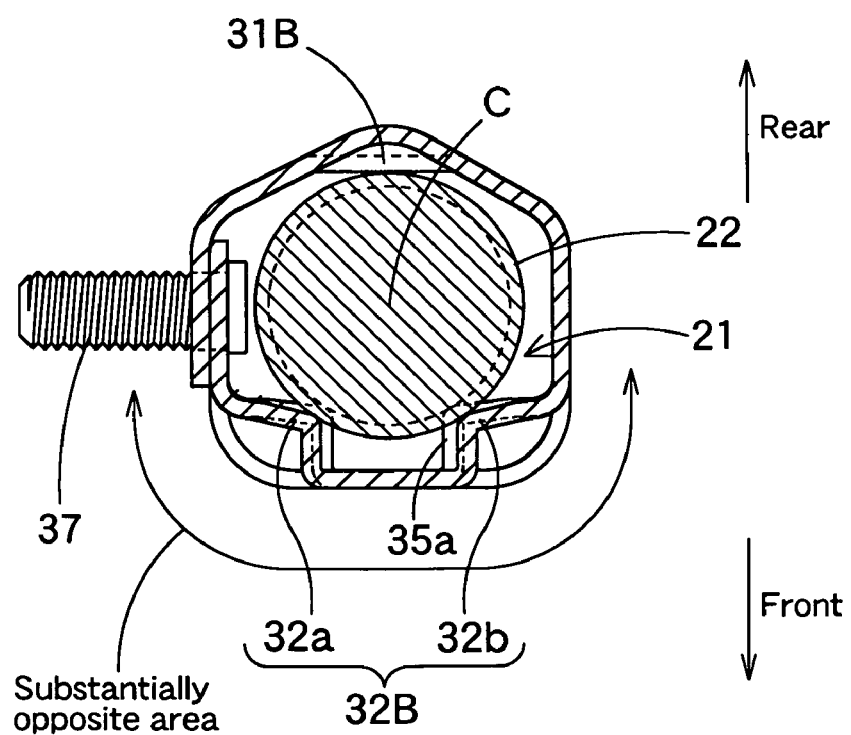
FIG. 17 is a schematic cross section of the inflator of FIG. 14, taken along line XVII-XVII of FIG. 15.
Figure 18:
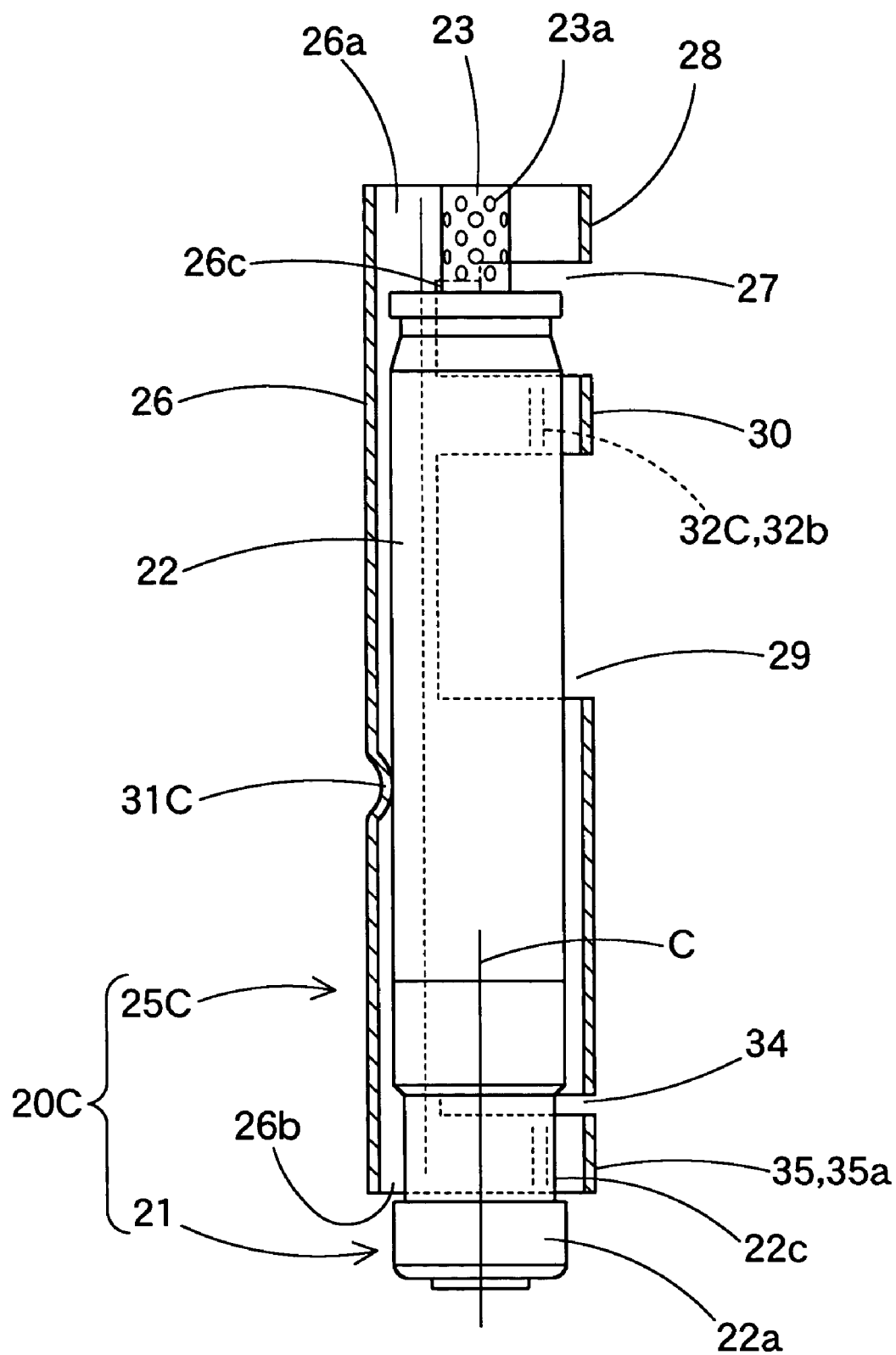
FIG. 18 is a schematic vertical section of still another embodiment of the inflator.
Figure 19:
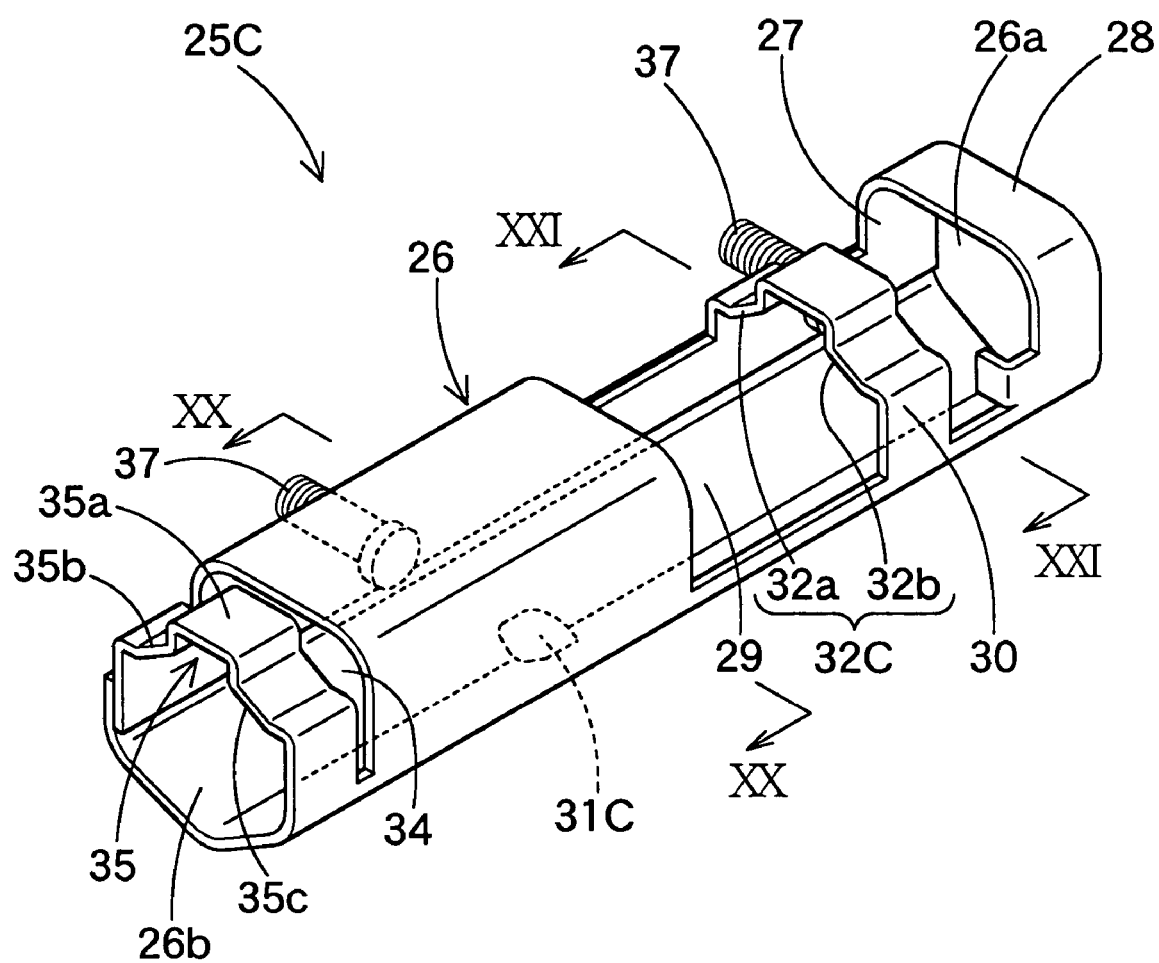
FIG. 19 is a perspective view of a retainer of the inflator of FIG. 18.
Figure 20:
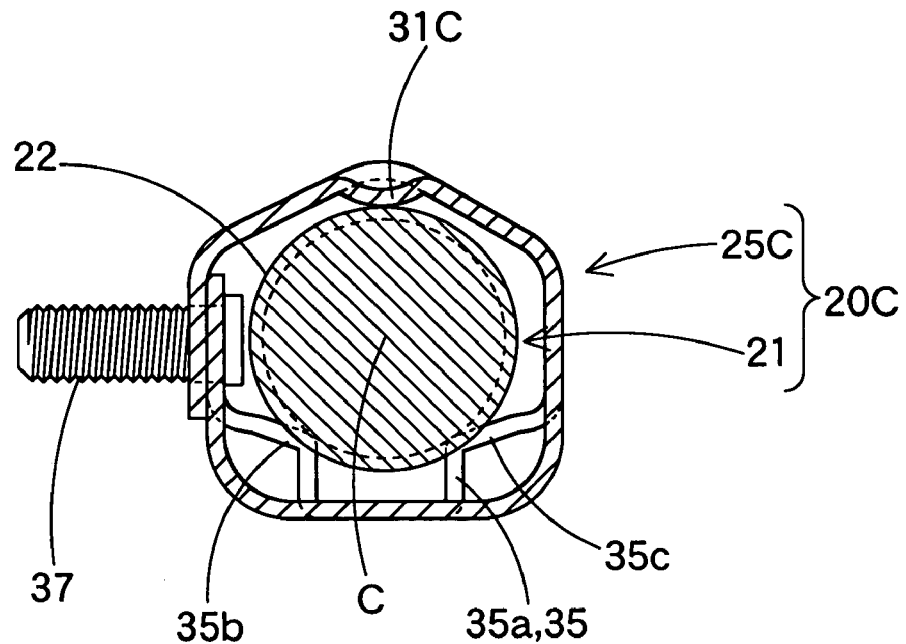
FIG. 20 is a schematic cross section of the inflator of FIG. 18, taken along line XX-XX of FIG. 19.
Figure 21:
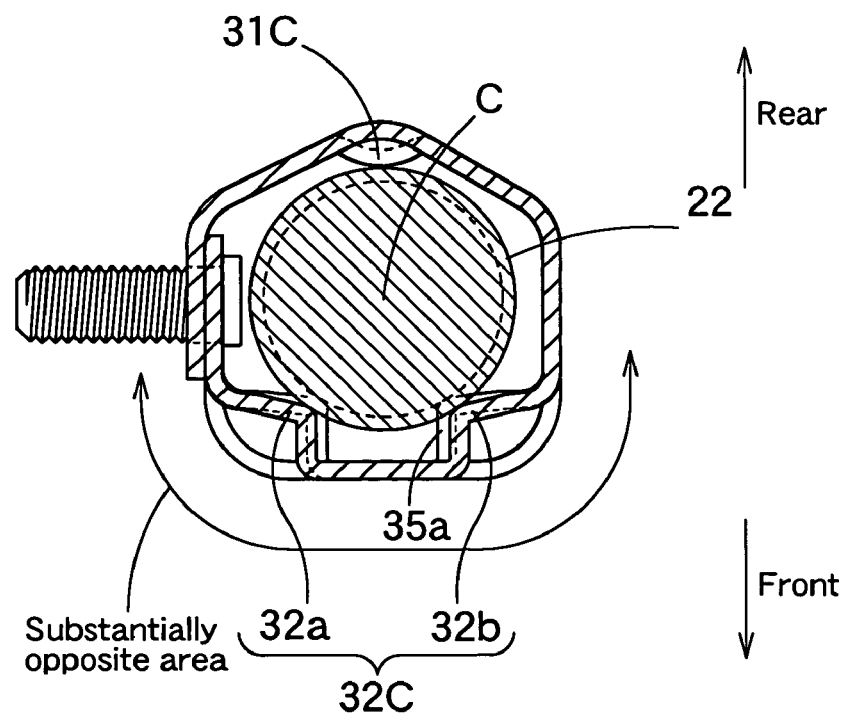
FIG. 21 is a schematic cross section of the inflator of FIG. 18, taken along line XXI-XXI of FIG. 19.

The construction of having two clamping portions may also be applied to the first and second support portions not only to the fastening portion 35. In a retainer 25A of an inflator 20A shown in FIGS. 10 to 12, for example, a first support portion 31A and a second support portion 32A both include two clamping portions 31a, 31b, 32a and 32b, respectively, which project inward to abut against the circumference of the inflator body 21 when fastened. A circumferential middle point between the clamping portions 31a and 31b is located in a substantially opposite point from a circumferential middle point between the clamping portions 35b and 35c in the circumference of the body 21 based on the center C of a cross section of the body 21 taken perpendicularly to the axial direction of the body 21. A circumferential middle point between the clamping portions 32a and 32b is substantially consistent with the circumferential middle point between the clamping portions 35b and 35c in the circumference of the body 21 based on the center C of a cross section of the body 21 taken perpendicularly to the axial direction of the body 21.

As retainers 25B and 25C of inflators 20B and 20C shown in FIGS. 14 to 21, it will also be appreciated that the second support portion 32B/32C includes two clamping portions 32a and 32b while the first support portion 31B/31C includes one clamping portion. The first support portion 31B shown in FIGS. 14 to 17 is formed into a bead extending flatly in axial direction of the retainer 25B by pressing work, and the first support portion 31C shown in FIGS. 18 to 21 is formed into a bead curved and projected inward of the retainer 25C by pressing work.

Figure 22:
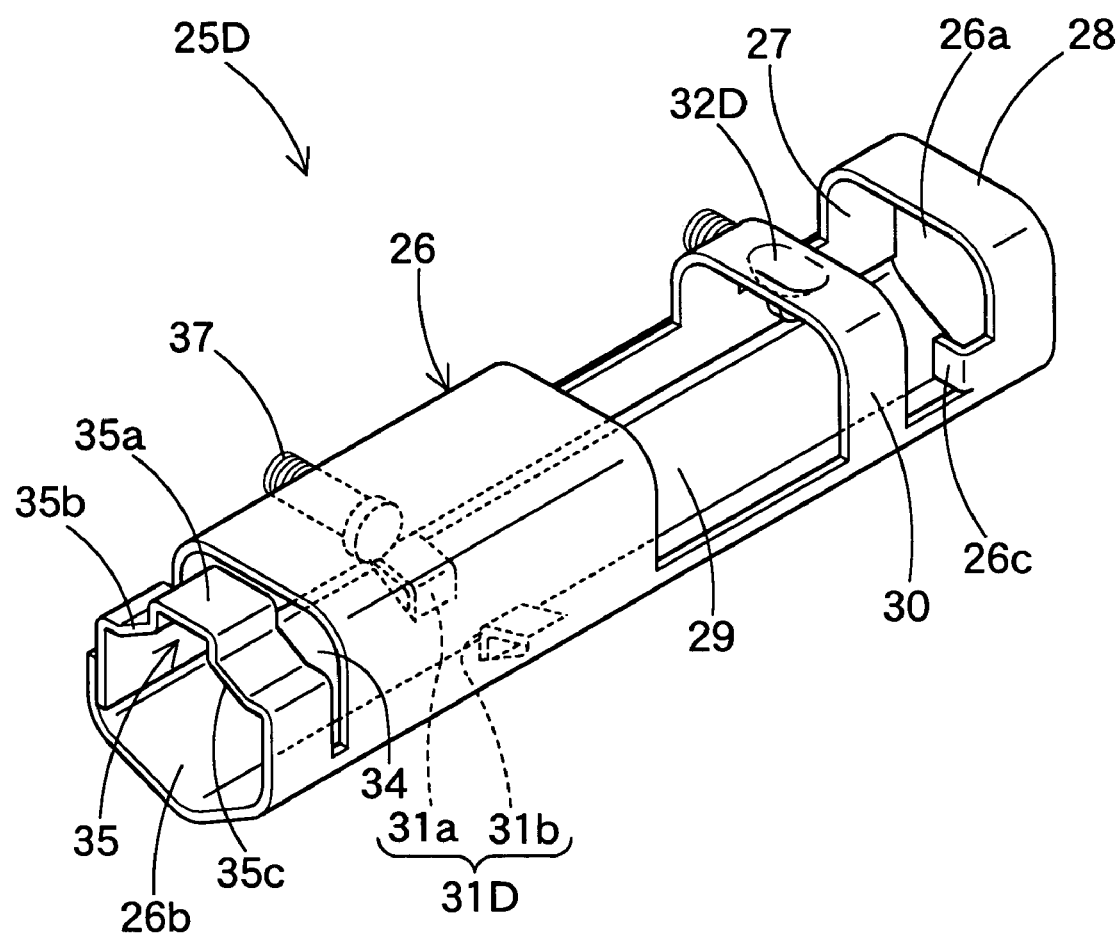
FIG. 22 is a perspective view of a retainer employed in still another embodiment of the inflator.

Moreover, as an inflator 20D shown in FIG. 22, it will also be appreciated that a first support portion 31D includes two clamping portions 31a and 31b while the second support portion 32D includes one clamping portion.

In each of the retainers 25A, 25B, 25C and 25D, the first support portion 31A, 31B, 31C or 31D is located in substantially axial middle point between the fastening portion 35 and the second support portion 32A, 32B, 32C or 31D.

Although the foregoing embodiments are described as applied to the side impact airbag device M mounted on a seat, it is not intended to be limited thereby. The present invention may also be applied to inflators employed in various airbag devices such as a knee-protecting airbag device and an airbag device for pedestrian-protection, on condition that the airbag devices include an inflator which includes a substantially cylindrical body for generating inflation gas and a substantially tubular retainer made of sheet metal for holding the body from outside, and that the retainer includes a mounting means such as bolts for mounting the airbag to amounting position, and holds the inserted body by fastening a fastening portion thereof.

The mounting means provided in the retainer 25 should not be limited to bolts 37 described in the foregoing embodiments, but also may be nuts, a mounting bracket with a nut, or a mounting pin.

The clamping portions 35b and 35c of the fastening portion 35 and the second support portion 32 in the retainer 25 are located in a position at substantially 180° from the first support potion 31 in the circumference of the body 21 based on the center C of the cross section of the body 21. However, it is sufficient that the clamping portions 35b and 35c of the fastening portion 35 and the second support portion 32 are located in a position away at least 90° from the first support potion 31 in the circumference of the body 21 based on the center C of the cross section of the body 21, as long as the retainer 25 holds the body 21 functioning like a lever by utilizing the first support portion 31 as fulcrum, and the fastening portion 35 and the second support portion 32 as effort-point and application-point.

What is claimed is:

1. An inflator for supplying inflation gas to an airbag of airbag device for automobile which is used in an inserted state in the airbag, the inflator comprising:
   a substantially cylindrical body for generating inflation gas; and
   a substantially tubular retainer made of sheet metal for being mounted around the body, the retainer including a mounting member for mounting the airbag to a predetermined mounting position and an element for holding the body, the element for holding the body consisting of:
   a fastening portion located in a vicinity of one end of the retainer for fastening on the body to deform plastically and protrude inward after the body of the inflator is inserted into the retainer which has been set inside the airbag in advance of the body;
   a first support portion projecting inward from an inner circumference of the retainer; and
   a second support portion projecting inward from the inner circumference of the retainer,
   wherein the fastening portion, the first support portion and the second support portion are arranged in order along axial direction of the body to abut against a circumference of the body, whereby the retainer holds the body at least at three axial positions by the fastening portion, the first support portion and the second support portion, and
   the fastening portion and the second support portion are located in a top portion on an outer circumference of the body and the first support portion is located in a bottom portion on an outer circumference of the body based on a center of a cross section of the body taken perpendicularly to the axial direction of the body as the retainer holds the body, wherein the top portion is substantially opposite to the bottom portion.

2. The inflator according to claim 1, wherein the fastening portion is projected from the airbag when the inflator is inserted and located in the airbag.

3. The inflator according to claim 1, wherein gas discharge ports of the body are located at an end of the body apart from the fastening portion, such that inflation gas is fed to the airbag from a location apart from the fastening portion.

4. The inflator according to claim 1, wherein the retainer comprises a positioning projection for positioning the body in the retainer by abutting against the body when the body is inserted into the retainer from a side of the fastening portion before fastened.

5. The inflator according to claim 1, wherein the second support portion is located in the vicinity of an end of the retainer apart from the other end having the fastening portion.

6. The inflator according to claim 1, wherein the first support portion is located substantially in an axial middle position in the retainer.

7. The inflator according to claim 1, wherein the first support portion and the second support portion are beads that are made by pressing a sheet metal forming the retainer.

8. The inflator according to claim 1, wherein at least one of the fastening portion, the first support portion, or the second support portion includes two contact points that project inward and contact the circumference of the body, the contact points are arranged along a circumferential direction of the retainer.

9. The inflator according to claim 1, wherein when fastening the fastening portion to the body, the fastening portion, the first support portion and the second support portion are pressed against the body by a leverage where the fastening portion is an effort-point, the first support portion is a fulcrum, and the second support portion is an application point, such that the body is held by the retainer.

10. An inflator for supplying inflation gas to an airbag of airbag device for automobile which is used in an inserted state in the airbag, the inflator comprising:
    a substantially cylindrical body for generating inflation gas; and
    a substantially tubular retainer made of sheet metal for being mounted around the body, the retainer including a mounting member for mounting the airbag to a predetermined mounting position and a tubular portion for holding the body, the tubular portion consisting of:
    a fastening portion located in a vicinity of one end of the retainer for fastening on the body to deform plastically and protrude inward after the body of the inflator is inserted into the retainer which has been set inside the airbag in advance of the body;
    a first support portion projecting inward from an inner circumference of the retainer; and
    a second support portion projecting inward from the inner circumference of the retainer, wherein the fastening portion, the first support portion and the second support portion are arranged in order along axial direction of the body to abut against a circumference of the body, whereby the retainer holds the body at least at three axial positions by the fastening portion, the first support portion and the second support portion, and the fastening portion and the second support portion are located only in a top portion on an outer circumference of the body and the first support portion is located only in a bottom portion on an outer circumference of the body based on a center of a cross section of the body taken perpendicularly to the axial direction of the body as the retainer holds the body, wherein the top portion is substantially opposite to the bottom portion.

11. An inflator for supplying inflation gas to an airbag of airbag device for automobile which is used in an inserted state in the airbag, the inflator comprising:

a substantially cylindrical body for generating inflation gas; and a substantially tubular retainer made of sheet metal for being mounted around the body, the retainer consisting of a mounting member for mounting the airbag to a predetermined mounting position, a fastening portion, a first support portion and a second support portion, wherein:

the first support portion and the second support portion are preliminarily formed on an inner circumference of the retainer before the retainer is mounted around the body;

the fastening portion is fastened on the body to deform plastically and protrude inward after the retainer is mounted around the body;

while the fastening portion is located in the vicinity of one end of the retainer, the fastening portion, the first support portion and the second support portion are arranged in order along axial direction of the body to abut against a circumference of the body, whereby the retainer holds the body at least at three axial positions by the fastening portion, the first support portion and the second support portion; and the fastening portion and the second support portion are located in a top portion on an outer circumference of the body and the first support portion is located in a bottom portion on an outer circumference of the body based on a center of a cross section of the body taken perpendicularly to the axial direction of the body as the retainer holds the body, wherein the top portion is substantially opposite to the bottom portion.

* * * * *